(12) United States Patent
Lee et al.

(10) Patent No.: US 11,831,980 B2
(45) Date of Patent: *Nov. 28, 2023

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Jaeyeop Lee, Suwon-si (KR); Dongchan Kim, Suwon-si (KR); Jongmyeong Ban, Suwon-si (KR); Hyechan Bae, Suwon-si (KR); Dongnam Byun, Suwon-si (KR); Seongwo Oh, Suwon-si (KR); Haedong Yeo, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,229

(22) Filed: Mar. 24, 2022

(65) Prior Publication Data

US 2022/0217269 A1 Jul. 7, 2022

Related U.S. Application Data

(63) Continuation of application No. 17/337,009, filed on Jun. 2, 2021, now Pat. No. 11,290,640.

(30) Foreign Application Priority Data

Jun. 10, 2020 (KR) .......................... 10-2020-0070568
Sep. 17, 2020 (KR) .......................... 10-2020-0119982

(51) Int. Cl.
*H04N 23/45* (2023.01)
*H04N 23/62* (2023.01)
(Continued)

(52) U.S. Cl.
CPC ........... *H04N 23/64* (2023.01); *H04N 1/2129* (2013.01); *H04N 5/2628* (2013.01); *H04N 23/45* (2023.01);
(Continued)

(58) Field of Classification Search
CPC .. H04N 1/2129; H04N 1/2137; H04N 5/2257; H04N 5/2258; H04N 5/23216;
(Continued)

(56) References Cited

U.S. PATENT DOCUMENTS 8,311,364 B2   11/2012   Cerosaletti et al.
9,185,286 B2   11/2015   Na et al.
(Continued)

FOREIGN PATENT DOCUMENTS

JP   2016-149663 A    8/2016
KR   10-2016-0024143 A   3/2016
(Continued)

OTHER PUBLICATIONS

Communication dated Sep. 27, 2021, issued by the International Searching Authority in counterpart International Application No. PCT/KR2021/006994 (PCT/ISA/210 and PCT/ISA/237).
(Continued)

*Primary Examiner* — Daniel M Pasiewicz
(74) *Attorney, Agent, or Firm* — Sughrue Mion, PLLC

(57) ABSTRACT

An electronic device and a controlling method of the electronic device are provided. The controlling method of an electronic device according to the disclosure includes the steps of, based on a first user input for or related to acquiring a live view image through a camera including a plurality of lenses different from one another being received, acquiring a plurality of image frames for each of the plurality of lenses and storing the image frames in a first memory, inputting the plurality of image frames for each lens stored in the first
(Continued)

memory into a neural network model, by a predetermined time interval, and acquiring score information including composition preference information of each of the input image frames, selecting at least one lens among the plurality of lenses based on the score information, storing image frames acquired through the selected at least one lens in a second memory during the predetermined time interval, and based on a second user input for initiating recording of the live view image being received, storing an image related to the image frames stored in the second memory in a third memory until a time point when a third user input for ending the recording is received.

20 Claims, 28 Drawing Sheets

(51) Int. Cl.
  H04N 23/667 (2023.01)
  H04N 23/57 (2023.01)
  H04N 23/60 (2023.01)
  H04N 5/262 (2006.01)
  H04N 1/21 (2006.01)
  H04N 23/63 (2023.01)
  H04N 23/951 (2023.01)
(52) U.S. Cl.
  CPC ........... *H04N 23/62* (2023.01); *H04N 23/631* (2023.01); *H04N 23/667* (2023.01); *H04N 23/951* (2023.01); *H04N 23/57* (2023.01)
(58) Field of Classification Search
  CPC ........... H04N 5/23222; H04N 5/23245; H04N 5/232933; H04N 5/232935; H04N 5/2628; H04N 23/45; H04N 23/57; H04N 23/62; H04N 23/631; H04N 23/632; H04N 23/64; H04N 23/667
  See application file for complete search history.

(56) References Cited

U.S. PATENT DOCUMENTS

| | | | |
|---|---|---|---|
| 9,241,109 B2 | 1/2016 | Watanabe | |
| 9,253,397 B2 | 2/2016 | Lee et al. | |
| 9,363,426 B2 | 6/2016 | Malkin et al. | |
| 10,075,653 B2 | 9/2018 | Jeong et al. | |
| 10,432,847 B2 | 10/2019 | Yamajo et al. | |
| 10,474,903 B2 | 11/2019 | Tandon et al. | |
| 10,812,768 B2 | 10/2020 | Youn et al. | |
| 11,145,088 B2 | 10/2021 | Kim et al. | |
| 11,290,640 B2 * | 3/2022 | Lee | H04N 5/23232 |
| 11,412,132 B2 | 8/2022 | Qin et al. | |
| 11,595,566 B2 | 2/2023 | Qin et al. | |
| 2013/0235224 A1 | 9/2013 | Park et al. | |
| 2014/0232904 A1 | 8/2014 | Na et al. | |
| 2016/0054903 A1 | 2/2016 | Jeong et al. | |
| 2016/0358631 A1 | 12/2016 | Lee | |
| 2019/0141307 A1 | 5/2019 | Youn et al. | |
| 2019/0377955 A1 | 12/2019 | Swaminathan et al. | |
| 2020/0134874 A1 | 4/2020 | Kim et al. | |
| 2021/0203836 A1 | 7/2021 | Qin | |
| 2022/0337742 A1 | 10/2022 | Qin et al. | |
| 2023/0188824 A1 | 6/2023 | Qin et al. | |

FOREIGN PATENT DOCUMENTS

| | | |
|---|---|---|
| KR | 10-2019-0051594 A | 5/2019 |
| KR | 10-2022444 B1 | 9/2019 |
| KR | 10-2020-0052462 A | 5/2020 |
| WO | 2020/019356 A1 | 1/2020 |

OTHER PUBLICATIONS

Communication dated Aug. 17, 2023, issued by the European Patent Office in European Application No. 21821347.8.

* cited by examiner

TELEPHOTO　　　WIDE ANGLE　　SUPER WIDE ANGLE

810

820

ELECTRONIC DEVICE AND CONTROLLING METHOD OF ELECTRONIC DEVICE

CROSS-REFERENCE TO RELATED APPLICATION(S)

This application is a continuation application of U.S. patent application Ser. No. 17/337,009, filed on Jun. 2, 2021, which is based on and claims priority under 35 U.S.C. § 119(a) of a Korean patent application number 10-2020-0119982, filed on Sep. 17, 2020 and a Korean patent application number 10-2020-0070568, filed on Jun. 10, 2020 in the Korean Intellectual Property Office, the disclosures of which are incorporated herein in their entirety by reference.

BACKGROUND

1. Field

The disclosure relates to an electronic device and a controlling method of the electronic device, and more particularly, to an electronic device that can automatically merge image frames acquired through each of a plurality of lenses and provide the image frames to a user, and a controlling method of the electronic device.

2. Description of Related Art

Recently, with the development of social media, etc., users producing image contents are increasing rapidly. In particular, the number of users trying to produce image contents of good quality by photographing a scene with a plurality of cameras included in one electronic device and then merging the photographed images into one image is also on an increasing trend.

Meanwhile, when a user directly merges image frames acquired through a plurality of cameras, there is an inconvenience for the user, and a considerable amount of effort and time may be spent by the user to master an application for image editing. Also, even if a user acquires an image by overcoming the inconvenience and the difficulty of an editing process, there is a problem in that the aesthetic quality of the image is not ensured.

Accordingly, there is a rising need for a technology which is capable of automatically combining the image frames acquired from different cameras and providing an image of high quality.

SUMMARY

An aspect of the disclosure provides an electronic device which is capable of acquiring a new image by automatically combining image frames suitable to be provided to a user among image frames acquired through each of a plurality of different lenses, and a controlling method of the electronic device.

According to an embodiment of the disclosure for achieving the aforementioned purpose, an electronic device includes a camera including a plurality of lenses different from one another, a first memory temporarily storing a plurality of image frames acquired through each of the plurality of lenses, a second memory temporarily storing image frames for a live view among the plurality of image frames stored in the first memory, a third memory storing an image related to the image frames stored in the second memory, and a processor configured to, based on a first user input for acquiring a live view image through the camera being received, acquire a plurality of image frames for each of the plurality of lenses and store the image frames in the first memory, input the plurality of image frames for each lens stored in the first memory into a neural network model, by a predetermined time interval, and acquire score information including composition preference information of each of the input image frames, select at least one lens among the plurality of lenses based on the score information, store image frames acquired through the selected at least one lens in the second memory during the predetermined time interval, and based on a second user input for initiating recording of the live view image being received, store an image related to the image frames stored in the second memory in the third memory until a time point when a third user input for ending the recording is received.

Also, according to an embodiment of the disclosure for achieving the aforementioned purpose, a controlling method of an electronic device includes the steps of, based on a first user input for acquiring a live view image through a camera including a plurality of lenses different from one another being received, acquiring a plurality of image frames for each of the plurality of lenses and storing the image frames in a first memory, inputting the plurality of image frames for each lens stored in the first memory into a neural network model, by a predetermined time interval, and acquiring score information including composition preference information of each of the input image frames, selecting at least one lens among the plurality of lenses based on the score information, storing image frames acquired through the selected at least one lens in a second memory during the predetermined time interval, and based on a second user input for initiating recording of the live view image being received, storing an image related to the image frames stored in the second memory in a third memory until a time point when a third user input for ending the recording is received.

In addition, according to an embodiment of the disclosure for achieving the aforementioned purpose, in a non-transitory computer readable recording medium including a program executing a controlling method of an electronic device, the controlling method of an electronic device includes the steps of, based on a first user input for acquiring a live view image through a camera including a plurality of lenses different from one another being received, acquiring a plurality of image frames for each of the plurality of lenses and storing the image frames in a first memory, inputting the plurality of image frames for each lens stored in the first memory into a neural network model, by a predetermined time interval, and acquiring score information including composition preference information of each of the input image frames, selecting at least one lens among the plurality of lenses based on the score information, storing image frames acquired through the selected at least one lens in a second memory during the predetermined time interval, and based on a second user input for initiating recording of the live view image being received, storing an image related to the image frames stored in the second memory in a third memory until a time point when a third user input for ending the recording is received.

In an exemplary embodiment, there may be an electronic device including: a camera system including a plurality of lenses that are different; a first memory configured to store a plurality of image frames acquired through each of the plurality of lenses; a second memory configured to store image frames for a live view among the plurality of image frames stored in the first memory; a third memory configured to store an image related to the image frames for the live view stored in the second memory; and a processor configured to: based on receiving a first user input relating to acquiring a live view image, control the camera system to acquire the plurality of image frames through each of the plurality of lenses and store the plurality of image frames in the first memory, input image frames of the plurality of image frames, in a predetermined time interval, for each of the plurality of lenses stored in the first memory into a neural network model, and acquire score information including composition preference information of each of the input image frames, select at least one lens among the plurality of lenses based on the score information, store in the second memory, image frames acquired through the selected at least one lens during the predetermined time interval, and based on receiving a second user input for starting recording of the live view image, store an image related to the image frames stored in the second memory in the third memory until a third user input for ending the recording is received.

In yet another embodiment, there is a controlling method of an electronic device, the method including: based on receiving a first user input relating to acquiring a live view image through a camera system including a plurality of lenses that are different, acquiring a plurality of image frames through each of the plurality of lenses and storing the plurality of image frames in a first memory; inputting image frames of the plurality of image frames, in a predetermined time interval, for each of the plurality of lenses stored in the first memory into a neural network model, and acquiring score information including composition preference information of each of the input image frames; selecting at least one lens among the plurality of lenses based on the score information; storing in a second memory, image frames acquired through the selected at least one lens during the predetermined time interval; and based on receiving a second user input for starting recording of the live view image, storing an image related to the image frames stored in the second memory in a third memory until a third user input for ending the recording is received.

In another embodiment, there is a non-transitory computer readable recording medium including a program executing the above controlling method of an electronic device.

DETAILED DESCRIPTION

Figure 1:
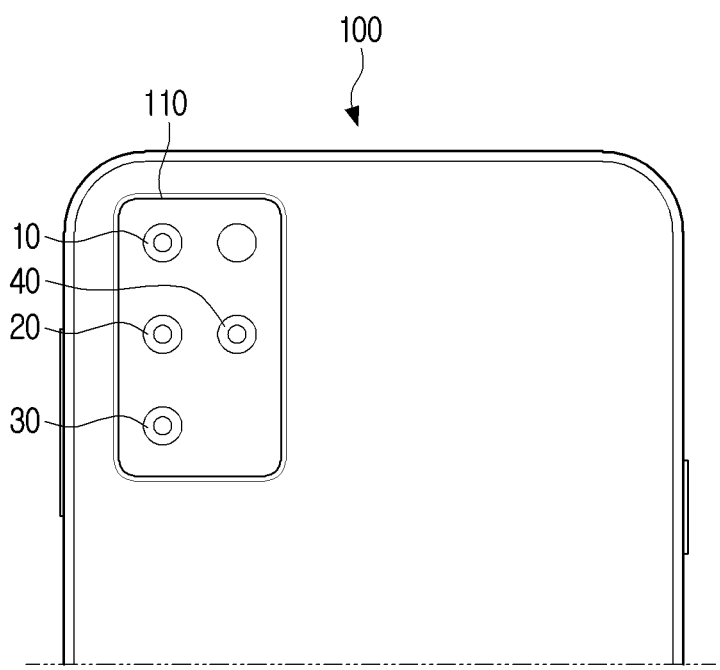
FIG. 1 is a diagram for schematically illustrating an electronic device according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, and/or alternatives of the embodiments of the disclosure. Also, with respect to the detailed description of the drawings, similar components may be designated by similar reference numerals.

Meanwhile, in case it is determined that in describing embodiments, detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Meanwhile, the terms used in the disclosure are used just to explain specific embodiments of the disclosure, and are not intended to limit the scope of the disclosure. Also, singular expressions include plural expressions, unless defined obviously differently in the context.

Further, in the disclosure, expressions such as "have," "may have," "include" and "may include" should be construed as denoting that there are such characteristics (e.g.: elements such as numerical values, functions, operations, and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second" and the like used in the disclosure may be used to describe various elements regardless of any order and/or degree of importance. Also, such expressions are used only to distinguish one element from another element, and are not intended to limit the elements.

Further, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Meanwhile, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a part' performs at least one function or operation, and it may be implemented as hardware or software, or as a combination of hardware and software. Further, a plurality of 'modules' or 'parts' may be integrated into at least one module and implemented as at least one processor, except 'modules' or 'parts' that need to be implemented as specific hardware.

Meanwhile, various elements and areas in drawings are illustrated schematically. Accordingly, the technical idea of the disclosure is not limited by the relative sizes or intervals illustrated in the accompanying drawings.

Meanwhile, an electronic device according to the various embodiments of the disclosure may include, for example, at least one of a smartphone, a tablet PC, a desktop PC, a laptop PC, or a wearable device. A wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.; electronic clothing), a body-attached device (e.g.: a skin pad or a tattoo), or a bio-implantable circuit.

In some embodiments, an electronic device may include, for example, at least one of a television, a digital video disk (DVD) player, an audio, a refrigerator, an air conditioner, a cleaner, an oven, a microwave oven, a washing machine, an air purifier, a set-top box, a home automation control panel, a security control panel, a media box (e.g.: Samsung Home-Sync™, Apple TV™, or Google TV™), a game console (e.g.: Xbox™, PlayStation™), an electronic dictionary, an electronic key, a camcorder, or an electronic photo frame.

In other embodiments, an electronic device may include at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g.: a navigation device for vessels, a gyrocompass, etc.), avionics, a security device, a head unit for a vehicle, an industrial or a household robot, a drone, an ATM of a financial institution, a point of sales (POS) of a store, or an Internet of things (IoT) device (e.g.: a light bulb, various types of sensors, a sprinkler device, a fire alarm, a thermostat, a street light, a toaster, exercise equipment, a hot water tank, a heater, a boiler, etc.).

Hereinafter, embodiments of the disclosure will be described in detail with reference to the accompanying drawings, such that those having ordinary skill in the art to which the disclosure belongs can easily carry out the embodiments.

FIG. 1 is a diagram for schematically illustrating an electronic device according to an embodiment of the disclosure.

As illustrated in FIG. 1, 'an electronic device 100' according to the disclosure may include a camera 110, and acquire an image through the camera 110. For example, the electronic device 100 may be implemented as a smartphone as illustrated in FIG. 1. However, the electronic device 100 according to the disclosure is not limited to a device of a specific type, and it may be implemented as various types of electronic devices 100 such as a tablet PC, a digital camera, a video camera, a notebook PC, etc.

The camera 110 of the electronic device 100 according to the disclosure may include a plurality of lenses that are different from one another. In another embodiment of the disclosure, the electronic device 100 may include a camera system that includes a plurality of cameras, and the plurality of cameras may include a plurality of lenses. Each of the plurality of cameras includes a lens that is different from another of the plurality of cameras. Each lens may be made up of a single lens or a combination of lenses.

Where a plurality of lenses are different, the fields of view (FOV) of the plurality of lenses are different and/or the locations of the plurality of lenses are different, etc. For example, as illustrated in FIG. 1, the camera 110 of the electronic device 100 may include a telephoto lens 10, a wide angle lens 20, and a super wide angle lens 30 at the rear of the electronic device 100, and also, it may include a three dimensional (3D) depth lens 40. Also, together with the telephoto lens 10, the wide angle lens 20, and the super wide angle lens 30 at the rear of the electronic device 100, the electronic device 100 may further include a telephoto lens (not shown) at the front of the electronic device 100. That is, there is no special limitation on the number and the types of lenses according to the disclosure. However, for the convenience of explanation below, explanation will be made focused on a case wherein the camera 110 of the electronic device 100 includes two lenses, i.e., a first lens and a second lens. Further, by being at a front or at a rear of the electronic device 100, the lens may be arranged in or arranged on the corresponding front surface or the rear surface of the electronic device 100.

Meanwhile, although not illustrated in FIG. 1, the electronic device 100 may include a memory inside the electronic device 100. Specifically, the electronic device 100 may include a first memory temporarily storing a plurality of image frames acquired through each of the plurality of lenses, a second memory temporarily storing image frames for a live view among the plurality of image frames stored in the first memory, and a third memory storing an image related to the plurality of image frames stored in the second memory. Hereinafter, explanation will be made based on the premise of a case wherein the electronic device 100 according to the disclosure includes a plurality of memories such as the first memory, the second memory, and the third memory, but the disclosure is not limited thereto. That is, the disclosure may be implemented such that at least two memories among the first memory, the second memory, and the third memory are included in a memory which is physically one piece of hardware, and correspond to each of a plurality of areas allotted inside the memory.

Figure 2:
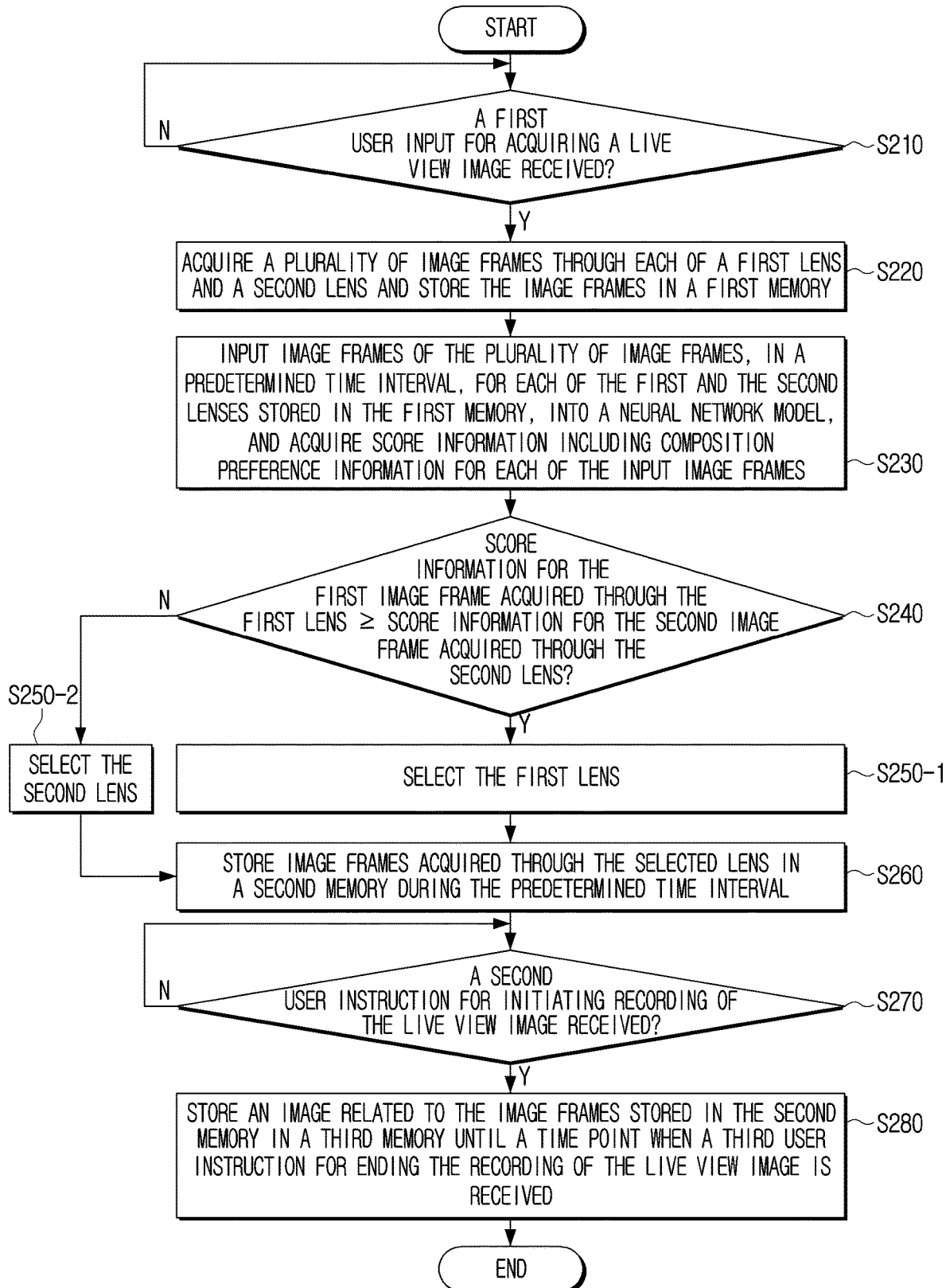
FIG. 2 is a flow chart illustrating each operation of a controlling method of an electronic device according to an embodiment of the disclosure.

FIG. 2 is a flow chart illustrating each operation of a controlling method of an electronic device according to an embodiment of the disclosure.

As illustrated in FIG. 2, the electronic device 100 according to the disclosure may receive a first user input for or related to acquiring a live view image at operation S210. Here, 'a live view image' refers to an image wherein a light that comes in through the lens of the camera is converted into an electronic image signal through an image sensor of the camera and is displayed on a display of the electronic device 100. Also, 'a first user input' may be, for example, a user input for operating a camera application stored in the electronic device 100. In addition, the first user input may be received based on a user touch input through the display of the electronic device 100, a user voice received through a microphone of the electronic device 100 or input of a physical button provided on the electronic device 100, a control signal transmitted by a remote control device for controlling the electronic device 100, etc.

If the first user input for or related to acquiring a live view image is received, the electronic device 100 may acquire a plurality of image frames from each of the plurality of lenses and store the image frames in the first memory. Specifically, in case the camera of the electronic device 100 includes two lenses, i.e., the first lens and the second lens, if the first user input is received, the electronic device 100 may acquire a plurality of image frames through each of the first lens and the second lens and store the image frames in the first memory at operation S220. More specifically, if the first user input is received, the electronic device 100 may simultaneously operate the first lens and the second lens, and acquire a first plurality of image frames through the first lens, and acquire a second plurality of image frames through the second lens while acquiring the first plurality of image frames through the first lens. Then, the electronic device 100 may temporarily store the first plurality of image frames acquired through the first lens and the second plurality of image frames acquired through the second lens in the first memory. Here, image frames among the first and the second plurality of image frames, acquired at time points identical to one another may correspond to one another.

Meanwhile, the first lens and the second lens according to the disclosure may be different, and accordingly, objects and the angles of the objects included in the image frames acquired through the first lens and the image frames acquired through the second lens at the same time point may be different.

For example, if the first lens is a wide angle lens at the rear of the electronic device 100, and the second lens is a super wide angle lens arranged at the rear of the electronic device 100, an object not included in the image frames acquired through the first lens may be included in the image frames acquired through the second lens having a wider angle of view than the first lens. Further, even if an object included in the image frames acquired through the first lens and an object included in the image frames acquired through the second lens are identical to each other, the angle that the object has in the image frames acquired through the first lens and the angle that the object has in the image frames acquired through the second lens having a wider angle of view than the first lens may be different from each other. Accordingly, image frames to be included in an image to be provided to a user need to be selected among the image frames acquired through the first lens and the image frames acquired through the second lens at the same time point, and for this, the electronic device 100 according to the disclosure may acquire score information by using a neural network model as it will be explained below.

The electronic device 100 may input image frames of the plurality of image frames of each lens stored in the first memory into a neural network model, by a predetermined time interval, and acquire score information of each of the input image frames. Specifically, the electronic device 100 may input the image frames of plurality of image frames, that are acquired during a predetermined time interval, into a neural network model and acquire score information of each of the input image frames at operation S230.

More specifically, if score information of all image frames stored in the first memory is acquired whenever a plurality of image frames are acquired and stored in the first memory, delay in the processing speed may be caused. Thus, the electronic device 100 may sequentially input some image frames stored in the first memory into a neural network model at a time point corresponding to the predetermined time interval among the plurality of image frames stored in the first memory, and acquire respective score information of each of the input image frames.

For example, a predetermined time interval may be 0.2 second, and in case it is set that image frames are acquired by a frame rate of 30 frames per second (fps), the electronic device 100 may sequentially input six frames of the plurality of image frames stored in the first memory, into a neural network model and acquire respective score information of the input image frames. However, the predetermine time interval is not limited to the aforementioned example.

Meanwhile, in the disclosure, 'score information' refers to a value that puts together evaluation results according to the types of objects included in image frames and the compositions of the objects, etc. and indicates the results quantitatively. Specifically, score information according to the disclosure may be determined based on whether a predetermined object is included in an image frame or how the aesthetic sense is according to the composition of an object inside an image frame, e.g., the aesthetics of the composition of an object inside an image frame. Here, information indicating the aesthetic sense according to the compositions by which whole components such as objects and the background included in an image frame are arranged in the image frame is referred to as 'composition preference information.' Meanwhile, the term score information according to the disclosure may be interchangeable with the term 'score' indicating a quantitative value itself.

Meanwhile, the feature that score information can be acquired 'by inputting an image frame into a trained neural network model' may include not only a case wherein output of a neural network model is the score information itself, but also a case wherein score information is acquired based on information output by a neural network model. Specifically, score information according to the disclosure may be acquired by various methods according to types of neural network models as below.

First, the electronic device 100 may acquire score information by using a first neural network model trained to output score information of an image frame. Specifically, the electronic device 100 may input an image frame into a first neural network model, and acquire score information of the image frame as output for the input image frame.

For example, the first neural network model may be a so-called aesthetic model. An aesthetic model may output score information indicating how much similar the composition of an input image frame is to the composition of learning data evaluated by an expert. That is, an aesthetic model may output composition preference information as defined above as score information.

Second, the electronic device 100 may acquire score information by using a second neural network model trained to output information of the location of an object included in an image frame. Specifically, the electronic device 100 may input an image frame into a second neural network model, and acquire information of the location of an object included in the input image frame, and acquire score information based on predefined rules related to compositions of objects.

For example, the second neural network model may be an object detection model, a salient object detection model (a saliency model), or an object segmentation model. An object detection model may output information of the location of an object included in an input image frame, for example, information of a bounding box corresponding to the location of an object included in an input image frame. Also, a salient object detection model may use a visual attention mechanism, and output information of a saliency map displaying a salient object included in an input image frame by distinguishing the object from the surrounding area. In addition, an object segmentation model may output information of the location of an object corresponding to the shape of an object included in an input image frame.

Third, the electronic device 100 may acquire score information by using a third neural network model trained to output information of the type of an object together with information of the location of the object included in an image frame. Specifically, the electronic device 100 may acquire information of the type of an object and information of the location of the object by using a third neural network model, and acquire score information based on predefined rules related to types of objects and compositions of objects, etc.

For example, the third neural network model may be a so-called object recognition model. An object recognition model may not only output information of the location of an object like the aforementioned object detection model, but also classify the characteristic of a detected object and output information of the type of the object.

Meanwhile, predefined rules applied after using the second neural network model or the third neural network model may include at least one of various rules such as whether an object is located on an intersecting point wherein an image frame is trisected in the horizontal/vertical directions (a so-called trisection rule), whether an object is located in the center part of an image frame, whether an image frame satisfies symmetry, etc. Also, to the predefined rules, various rules such as whether a space between a person and the uppermost end of an image frame (a so-called head room) is appropriate in case the type of an object falls under a person, whether a vanishing point exists within an image frame, whether a horizontal line exists in a horizontal direction within an image frame, whether a horizontal line exists in an appropriate location within an image frame, etc. may be added. A process of acquiring score information by using a neural network model according to the disclosure and predefined rules related thereto will be described in more detail with reference to FIG. 3 to FIG. 4K.

When score information is acquired through the aforementioned process, the electronic device 100 may select at least one lens among a plurality of lenses based on the acquired score information, and store image frames acquired through the selected at least one lens in the second memory during a predetermined time interval. That is, the electronic device 100 may select two or more lenses among a plurality of lenses based on score information, and store image frames acquired through each of the selected two or more lenses in the second memory during a predetermined time interval.

Here, the reason that not one lens but two or more lenses are selected is that a method of synthesizing a plurality of image frames acquired through different lenses at the same time point may be used in a process of applying a scene transition effect to at least some of image frames acquired through different lenses, as will be described below. Also, it is because image frames acquired through a specific lens may be stored in the form of raw data. However, hereinafter, explanation will be made focused on a case wherein one lens is selected among a plurality of lenses, for the convenience of explanation. Meanwhile, hereinafter, explanation will be made based on the premise that score information indicates a quantitative value itself, and as the quantitative value is higher, the evaluation result according to types of objects and compositions of objects, etc. is superior.

Specifically, if score information of the first image frame acquired through the first lens is higher than or identical to score information of the second image frame acquired through the second lens at the time point when the first image frame was acquired at operation S240-Y, the electronic device 100 may select the first lens between the first lens and the second lens at operation S250-1, and store the image frames acquired through the first lens in the second memory during a predetermined time interval at operation S260. In contrast, if score information of the first image frame is lower than score information of the second image frame at operation S240-N, the electronic device 100 may select the second lens between the first lens and the second lens at operation S250-2, and store the image frames acquired through the second lens in the second memory during a predetermined time interval at operation S260.

Here, 'a predetermined time interval' may be identical to the time interval of inputting a plurality of image frames for stored in the first memory into a neural network model at operation S230. Specifically, if at least one lens is selected among a plurality of lenses based on score information acquired through a neural network model, the electronic device 100 may store the image frames acquired through the at least one lens selected earlier in the second memory until at least one lens among the plurality of lenses is selected again by inputting other image frames stored in the first memory into the neural network model afterwards. For example, the electronic device 100 may input the plurality of image frames for each lens stored in the first memory into the neural network model at an interval of 0.2 second, and select at least one lens among the plurality of lenses at the interval of 0.2 second in accordance thereto, and when at least one lens is selected among the plurality of lenses, the electronic device 100 may store the image frames acquired through the selected at least one lens in the second memory for 0.2 second.

Meanwhile, in the case of inputting the plurality of image frames for each lens stored in the first memory into the neural network model by a predetermined time interval and selecting at least one lens among the plurality of lenses based on the predetermined time interval, if an image is generated by merging image frames acquired through different lenses as will be described below, switching between image frames for each different lens will be performed excessively in the generated image, and accordingly, unnaturalness will be generated. That is, in case the predetermined time interval is 0.2 second, a section wherein switching between image frames for each different lens is performed every 0.2 second may be generated in the generated image. Thus, according to an embodiment of the disclosure, regardless of one lens being selected among the plurality of lenses based on score information as described above, a minimum time during which selection of a specific lens is maintained may be set. For example, even in case score information of the first image frame is lower than score information of the second image frame, the electronic device 100 may select the first lens between the first lens and the second lens in the corresponding section, for maintaining selection of the first lens greater than or equal to the predetermined minimum time.

Meanwhile, the process of acquiring score information of the first image frame and score information of the second image frame may vary according to the types of the first lens and the second lens included in the camera of the electronic device 100, as will be described below.

According to an embodiment of the disclosure, the camera of the electronic device 100 according to the disclosure may include a first lens which is a wide angle lens arranged at the rear of the electronic device 100 and a second lens which is a super wide angle lens at the rear of the electronic device 100. In this case, if a predetermined object is not included in the first image frame but included in the second image frame, score information of the first image frame may be acquired as a lower value than score information of the second image frame. In other words, if at least some parts of a specific object are beyond the angle of view of the first lens which is a wide angle lens and are not beyond but within the angle of view of the second lens which is a super wide angle lens at a specific time point, it may be evaluated that the compositions of the frames acquired through the second lens are better than the compositions of the frames acquired through the first lens at the specific time point. Also, in this case, the electronic device 100 may select the second lens between the first lens and the second lens, and store the image frames acquired through the second lens in the second memory.

Meanwhile, 'a predetermined object' may be an object selected by the user of the electronic device 100 among the plurality of objects included in the first image frame or the second image frame, and it may be, for example, a person or an animal. Also, the feature that a predetermined object is included in a specific image frame may mean that the entirety of the predetermined object is included in the specific image frame, and the feature that a predetermined object is not included in a specific image frame may mean that at least one or more parts of the predetermined object are not included in the specific image frame.

A specific process of acquiring score information according to the disclosure in case the first lens included in the camera of the electronic device 100 is a wide angle lens at the rear and the second lens is a super wide angle lens at the rear will be described in more detail with reference to FIGS. 5A-5B.

According to another embodiment of the disclosure, the camera of the electronic device 100 according to the disclosure may include a first lens at the rear of the electronic device 100 and a second lens at the front of the electronic device 100. In this case, if a predetermined operation of a user is included in the second image frame, score information of the first image frame may be acquired as a lower value than score information of the second image frame. In other words, regardless of how the score information of the first image frame acquired through the first lens at the rear of the electronic device 100 is in a specific section, if a predetermined operation of a user is included in the second image frame as a result of analyzing the second image frame acquired through the second lens at the front of the electronic device 100, it may be evaluated that the score information of the second image frame is higher than the score information of the first image frame. Also, in this case, the electronic device 100 may select the second lens between the first lens and the second lens, and store the image frames acquired through the second lens in the second memory.

Here, 'a predetermined operation of a user' may include operations such as an operation of exposing a palm, a smiling operation, an uttering operation, etc. A specific process of acquiring score information according to the disclosure in case the camera of the electronic device 100 further includes a lens at the front of the electronic device 100 will be described in more detail with reference to FIG. 6.

Meanwhile, when image frames acquired through the selected at least one lens are stored in the second memory, the electronic device 100 may display the image frames stored in the second memory on the display of the electronic device 100. That is, the electronic device 100 may provide a live view image (or a preview image) to a user in real time based on the image frames acquired through the selected at least one lens.

In particular, the electronic device 100 may display the image frames acquired through the selected at least one lens on the display as an entire screen, and while displaying the image frames acquired through one lens set as a default between the first lens and the second lens on the display as an entire screen, the electronic device 100 may display the image frames acquired through the selected at least one lens in the form of Picture by Picture (PBP) or Picture in Picture (PIP) on the display.

Meanwhile, the electronic device 100 may receive a second user input for initiating or starting recording of the live view image at operation S270. Then, if the second user input for initiating or starting recording of the live view image is received at operation S270-Y, the electronic device 100 may store an image related to the image frames stored in the second memory in a third memory until a time point when a third user input for ending the recording of the live view image is received at operation S280.

Here, 'a second user input' may be, for example, a user input for selecting a recording button included in a user interface provided through a camera application, and 'a third user input' may be, for example, a user input for selecting a recording ending button included in a user interface provided through a camera application. However, examples of the second user input and the third user input are not limited thereto, and the second user input and the third user input may be received based on a user touch input through the display of the electronic device 100, a user voice received through a microphone of the electronic device 100 or input of a physical button provided on the electronic device 100, a control signal transmitted by a remote control device for controlling the electronic device 100, etc.

Specifically, when the second user input is received, the electronic device 100 may initiate an operation of generating an image related to the image frames stored in the second memory and storing the image in the third memory, and the operation of generating an image related to the image frames stored in the second memory and storing the image in the third memory may be continued until the third user input is received. Here, 'an image related to the image frames stored in the second memory' refers to an image generated by merging at least some of the image frames stored in the second memory according to the time order that the image frames were acquired. However, unlike a live view image displayed on the display in real time, an image stored in the third memory may be an image generated in the form of digital data through a codec. Hereinafter, an image stored in the third memory will be concisely referred to as 'a stored image,' by distinguishing it from a live view image displayed on the display.

Meanwhile, the electronic device 100 may not only just merge the first image frame and the second image frame, but also additionally perform an editing process or a synthesizing process together, for not the switching between the image frames acquired through the first lens and the image frames acquired through the second lens, in the stored image unnatural.

In particular, the electronic device 100 may select a partial area of the image frames stored in the second memory, enlarge the selected partial area, and merge the area into other image frames. For example, in case the first lens is a wide angle lens at the rear of the electronic device 100 and the second lens is a super wide angle lens at the rear of the electronic device 100, the electronic device 100 may select a partial area in the image frames acquired through the second lens having a wider angle of view, enlarge the selected partial area, and merge the enlarged selected partial area into the image frames acquired through the first lens. Accordingly, unnaturalness according to drastic change of sizes of objects between the image frames acquired through the first lens and the image frames acquired through the second lens can be prevented. Here, for enhancing the resolutions of the image frames that are reduced as the selected partial area are enlarged, the electronic device 100 may additionally perform a process of applying various kinds of super resolution techniques after enlarging the selected partial area.

Also, the electronic device 100 may acquire a stored image wherein a scene transition effect was applied to at least some of the image frames acquired through the first lens and the image frames acquired through the second lens in the stored image. An embodiment related to a scene transition effect according to the disclosure will be described in more detail with reference to FIG. 9A and FIG. 9B.

So far, an editing process or a synthesizing process for not making the switching between the image frames acquired through the first lens and the image frames acquired through the second lens in a stored image appear unnatural was described. However, the editing process or the synthesizing process as described above can also be applied in displaying a live view image on the display based on the image frames stored in the second memory.

According to the various embodiments of the disclosure as described above, the electronic device 100 may acquire a new image by automatically adding image frames suitable to be provided to a user among image frames acquired for each of a plurality of lenses different from one another included in the camera, and accordingly, noticeable user convenience can be provided.

Also, in case a neural network model according to the disclosure is implemented in the form of an on-device, a lens acquiring image frames to be provided to a user can be selected among a plurality of lenses without transmitting image frames acquired for each of the plurality of lenses to an external server. That is, according to the disclosure, security related to privacy of a user can be secured together with user convenience.

Further, while the electronic device 100 according to the disclosure acquires a plurality of image frames for each of a plurality of lenses, the electronic device 100 may provide image frames corresponding to a lens selected in real time to a user by a live view method. Also, the electronic device 100 may generate an image wherein the image frames corresponding to the lens selected in real time are merged, and thus user convenience can be further improved.

Figure 3:
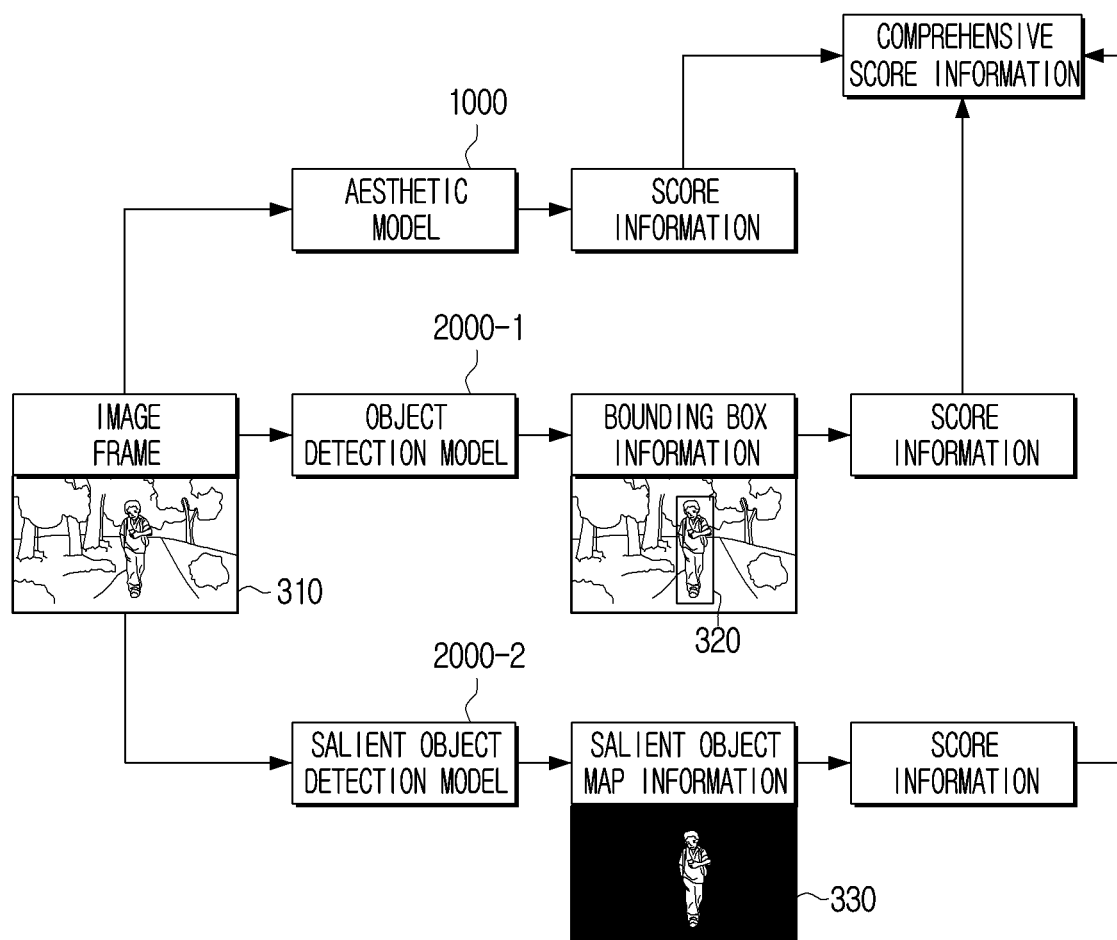
FIG. 3 is a diagram for illustrating in detail a process of acquiring score information by using a neural network model according to the disclosure.
Figure 4A:
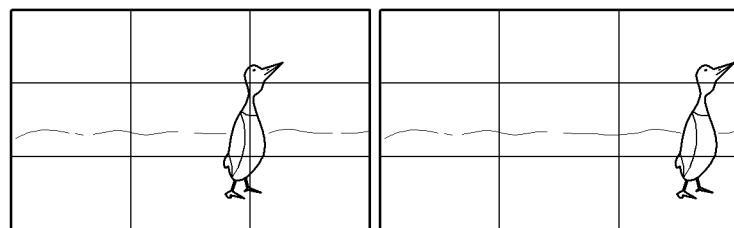
FIG. 4A-4K are diagrams for illustrating in detail predefined rules related to score information.
Figure 4B:
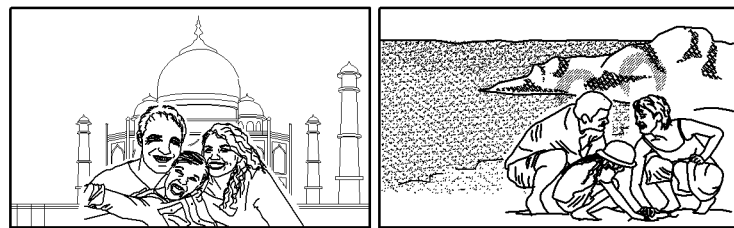
Figure 4C:
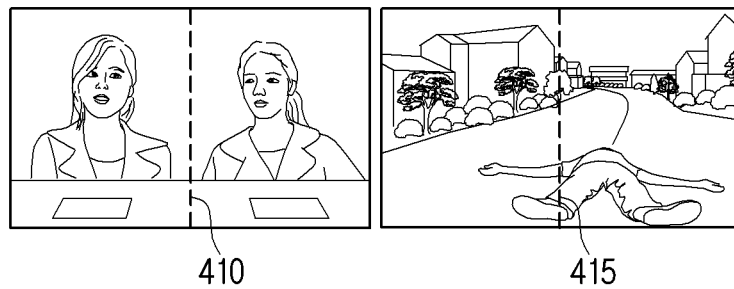
Figure 4D:
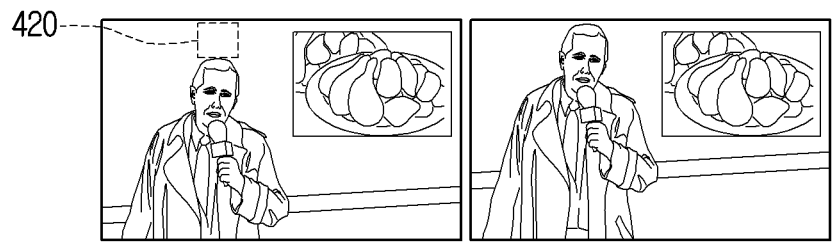
Figure 4E:
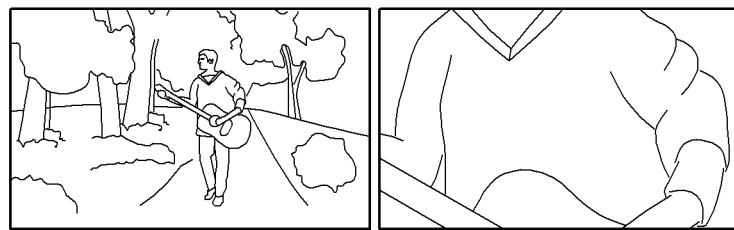
Figure 4F:
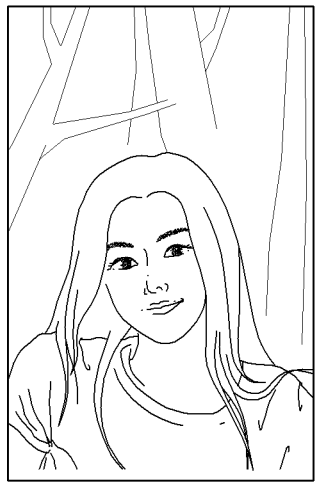
Figure 4F:
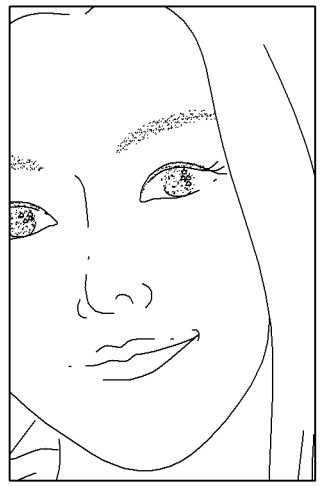
Figure 4G:
Figure 4G:
Figure 4H:
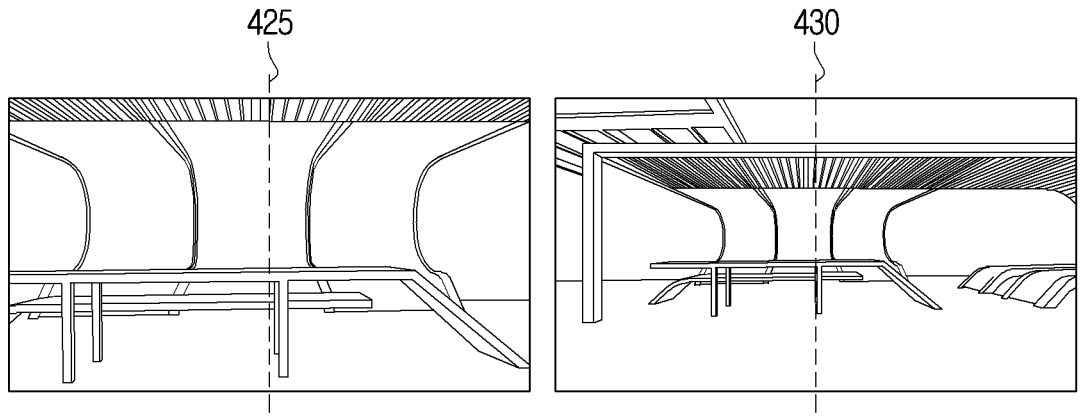
Figure 4I:
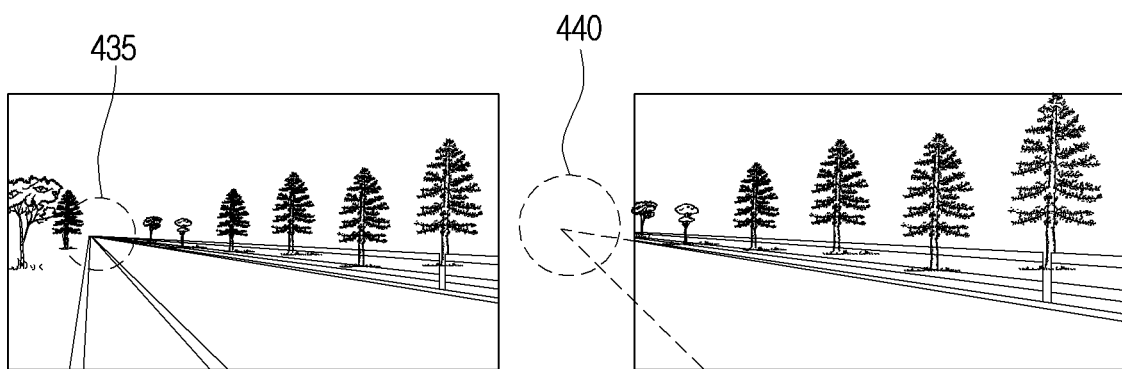
Figure 4J:
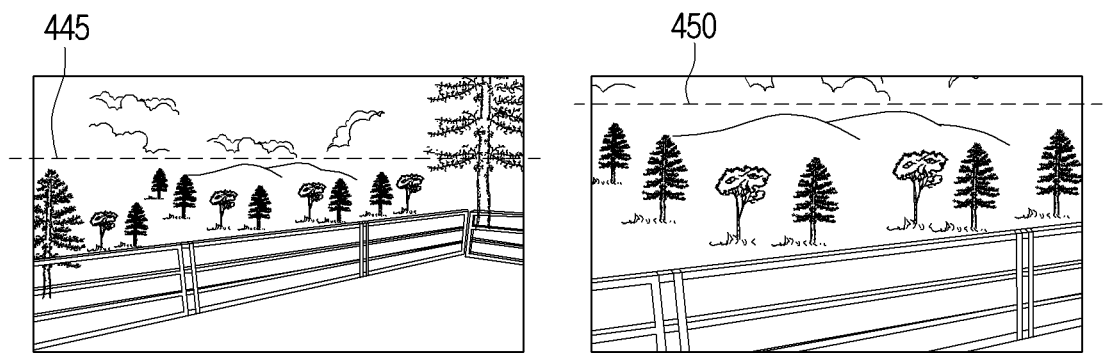
Figure 4K:
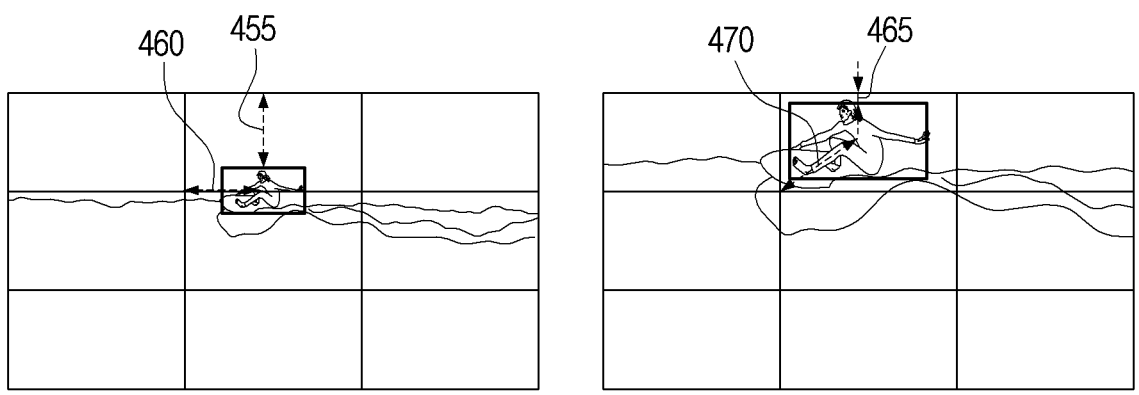

FIG. 3 is a diagram for illustrating in detail a process of acquiring score information by using a neural network model according to the disclosure, and FIG. 4A to FIG. 4K are diagrams for illustrating in detail predefined rules related to score information. That is, FIG. 3 to FIG. 4K are diagrams for illustrating in more detail the operation S230 in FIG. 2.

First, 'a neural network model' refers to an artificial intelligence model including an artificial neural network, and it may be trained by deep learning. For example, a neural network model may include at least one artificial neural network among a Deep Neural Network (DNN), a Convolution Neural Network (CNN), a Recurrent Neural Network (RNN), and Generative Adversarial Networks (GAN). However, the neural network model according to the disclosure is not limited to the aforementioned examples.

As described above, the neural network model according to the disclosure may include a first neural network model trained to output score information of the composition of an image frame, a second neural network model trained to output information of locations of objects included in an image frame, and a third neural network model trained to output information of types of objects together with information of the locations of the objects included in an image frame.

In FIG. 3, information output by each neural network model and a process of acquiring score information according to the disclosure in accordance thereto will be described in detail based on the premise of a case wherein image frames acquired through a plurality of lenses are input into an aesthetic model 1000, an object detection model 2000-1, and a salient object detection model (a saliency model) 2000-2 among the neural network models according to the disclosure. Here, an image frame input into a neural network model may be input in the form of data including information of the horizontal length of the image frame, the vertical length of the image frame, and the RGB values for each pixel of the image frame.

The aesthetic model 1000 refers to a neural network model trained to output score information indicating how similar the composition of an input image frame is to the composition of learning data evaluated by an expert, and it falls under an example of the first neural network model according to the disclosure. For example, as illustrated in FIG. 3, if an image frame 310 is input into the aesthetic model 1000, the aesthetic model 1000 may compare the input image frame 310 with learning data including information of a plurality of image frames evaluated to have good compositions by an expert, and output score information including the composition preference information of the input image frame 310.

The object detection model 2000-1 is an example of the second neural network model according to the disclosure. The object detection model 2000-1 refers to a neural network model trained to output information of the location of an object included in an input image frame. For example, as illustrated in FIG. 3, if an image frame 310 is input into the object detection model 2000-1, the object detection model 2000-1 may output information of a bounding box 320 corresponding to the location of an object included in the input image frame, as information of the location of an object included in the input image frame.

The salient object detection model 2000-2 is an example of the second neural network model according to the disclosure. The salient object detection model 2000-2 may output information of a saliency map displaying a salient object included in an input image frame by distinguishing the object from the surrounding area, by using a visual attention mechanism. For example, as illustrated in FIG. 3, if an image frame 310 is input into the salient object detection model 2000-2, the salient object detection model 2000-2 may output information of a saliency map 330 displaying a salient object included in the input image frame by distinguishing the object from the surrounding area.

Meanwhile, as described above, the aesthetic model 1000 may output score information itself, and in accordance thereto, the electronic device 100 may acquire score information through the aesthetic model 1000. In contrast, the object detection model 2000-1 or the salient object detection model 2000-2 may output information of the location of an object but not the score information itself. Accordingly, for acquiring score information related to the composition of an input image frame, a process of applying predefined rules related to score information, including a rule regarding whether an object is located in a good composition within the image frame, needs to be involved.

That is, if information of the location of an object is acquired through the object detection model 2000-1 or the salient object detection model 2000-2, the electronic device 100 may acquire score information by using predefined rules related to score information. Hereinafter, examples of predefined rules related to score information will be described with reference to FIG. 4A to FIG. 4K.

FIG. 4A is a diagram for illustrating a trisection rule. As illustrated in FIG. 4A, in the case of the image frame on the left side, an object is located on an intersecting point wherein the image frame is trisected in the horizontal/vertical directions, but in the case of the image frame on the right side, an object is arranged in a location that is far from an intersecting point wherein the image frame is trisected in the horizontal/vertical directions. In this case, according to the trisection rule, the image frame on the left side may have higher score information than the image frame on the right side.

FIG. 4B is a diagram for illustrating a rule regarding whether an object is located in the center part of an image frame. As illustrated in FIG. 4B, in the case of the image frame on the left side, an object is located in the center part of the image frame, but in the case of the image frame on the right side, an object is away from the center part of the image frame and is located toward one side. In this case, according to the rule regarding whether an object is located in the center part of an image frame, the image frame on the left side may have higher score information than the image frame on the right side.

FIG. 4C is a diagram for illustrating a rule regarding symmetry. As illustrated in FIG. 4C, in the case of the image frame on the left side, symmetry of the left side and the right side is high based on an image reference line 410, but in the case of the image frame on the right side, symmetry of the left side and the right side is relatively not high based on a reference line 415. In this case, according to the rule regarding symmetry, the image frame on the left side may have higher score information than the image frame on the right side. A reference line for determining symmetry may be a line that is vertically located in the dead center of an image frame like the reference lines 410, 415 in FIG. 4C, but is not limited thereto.

FIG. 4D is a diagram for illustrating a rule regarding a head room. As illustrated in FIG. 4D, in the case of the image frame on the left side, a space between a person and the uppermost end of an image frame (so-called headroom) exists as much as a space corresponding to the box 420 indicated in the drawing, but in the case of the image frame on the right side, a space between a person and the uppermost end of an image frame barely exists. In this case, according to the rule regarding a head room, the image frame on the left side may have higher score information than the image frame on the right side.

FIGS. 4E, 4F and 4G are diagrams for illustrating a rule regarding existence of an object. In particular, an object in the rule regarding existence of an object may be a person or an animal.

As illustrated in FIG. 4E, in the case of the image frame on the left side, the entire 'person' which is an object within an image frame exists within the image frame, but in the case of the image frame on the right side, only a part of a person is included within the image frame. In this case, according to the rule regarding existence of an object, the image frame on the left side may have higher score information than the image frame on the right side.

As illustrated in FIG. 4F, in the case of the image frame on the left side, the entire 'face of a person' which is an object within an image frame exists within the image frame, but in the case of the image frame on the right side, only a part of the face of a person is included within the image frame. In this case, according to the rule regarding existence of an object, the image frame on the left side may have higher score information than the image frame on the right side.

As illustrated in FIG. 4G, in the case of the image frame on the left side, the entire 'plurality of people' which are objects within an image frame exist within the image frame, but in the case of the image frame on the right side, some parts of the people on both of the left and right sides among the plurality of people are not included within the image frame. In this case, according to the rule regarding existence of an object, the image frame on the left side may have higher score information than the image frame on the right side.

FIG. 4H is a diagram for illustrating that the rule regarding symmetry as described in FIG. 4C can also be applied to the composition of a background. As illustrated in FIG. 4H, in the case of the image frame on the left side, symmetry of the left side and the right side is high based on a reference line 425, but in the case of the image frame on the right side, symmetry of the left side and the right side is relatively not high based on a reference line 430. In this case, according to the rule regarding symmetry, the image frame on the left side may have higher score information than the image frame on the right side.

FIG. 4I is a diagram for illustrating a rule regarding a vanishing point. As illustrated in FIG. 4I, in the case of the image frame on the left side, a vanishing point 435 exists within the image frame, but in the case of the image frame on the right side, a vanishing point 440 exists outside the image frame. In this case, according to the rule regarding a vanishing point, the image frame on the left side may have higher score information than the image frame on the right side.

FIG. 4J is a diagram for illustrating a rule regarding a horizontal line. As illustrated in FIG. 4J, in the case of the image frame on the left side, there is a space to a certain degree between a horizontal line 445 and the uppermost end of the image frame, but in the case of the image frame on the right side, there is relatively less space between a horizontal line 450 and the uppermost end of the image frame. In this case, according to the rule regarding a vanishing point, the image frame on the left side may have higher score information than the image frame on the right side.

FIG. 4K is a diagram for illustrating that score information may be acquired by putting together two or more rules among the predefined rules as described above. As illustrated in FIG. 4K, in the case of the image frame on the left side, there is distance 455 to a certain degree between a person and the uppermost end of the image frame, but in the case of the image frame on the right side, there is relatively little distance 460 between a person and the uppermost end of the image frame. Also, in the case of the image frame on the left side, the distance 465 between an intersecting point wherein the image frame is trisected in the horizontal/vertical directions and the center part of the object is close, but in the case of the image frame on the right side, the distance 470 between an intersecting point wherein the image frame is trisected in the horizontal/vertical directions and the center part of the object is far. Putting together the aforementioned contents, the image frame on the left side may have higher score information than the image frame on the right side.

So far, various examples of the predefined rules related to score information according to the disclosure were described, but they are merely examples that can be applied to the disclosure. That is, other than the rules described above, various kinds of rules that can evaluate the types of objects included in an image frame, the characteristics of the objects, and the compositions of the objects, etc. can obviously be applied to the disclosure. Also, which rules will be used among various kinds of rules, and what kinds of weighted values will be added for each rule may also be set differently according to the various embodiments of the disclosure. Meanwhile, a process of applying the aforementioned rules may not only be operated based on rules, but also be performed through a separate neural network model. Also, such a separate neural network model may be applied in a form of being integrated with the first neural network model, the second neural network model, or the third neural network model according to the disclosure.

Meanwhile, the neural network models according to the disclosure are not limited to the first neural network model, the second neural network model, or the third neural network model as described above, For example, the neural network models according to the disclosure may further include an emotion recognition model that can analyze a facial expression of a person and recognize the emotion of the person. In this case, if information that a person included in an image frame has a happy emotion is acquired through the emotion recognition model, the electronic device 100 may acquire score information based on whether the person is located in a good composition within the image frame.

Meanwhile, the electronic device 100 may perform a section selection process that will be described below based on one score information among score information acquired by using the first neural network model, score information acquired by using the second neural network model, and score information acquired by using the third neural network model. However, the electronic device 100 may also perform a section selection process based on comprehensive score information acquired by putting together at least two among score information acquired by using the first neural network model, score information acquired by using the second neural network model, and score information acquired by using the third neural network model. That is, as illustrated in FIG. 3, a merging section may be identified based on comprehensive score information acquired by putting together score information acquired by using the aesthetic model 1000, score information acquired by using the object detection model 2000-1, and score information acquired by using the salient object detection model 2000-2. Here, the comprehensive score information may be calculated by obtaining the sum or the average of each score information, or may be calculated by obtaining a weighted sum wherein a weighted value has been added to the value of specific score information.

Meanwhile, according to an embodiment of the disclosure, the electronic device 100 may select a neural network model used in acquiring score information differently according to whether a predetermined object is included in an image frame. Here, a predetermined object may be a person or an animal, but is not limited thereto. For example, if it is identified that a person which is a predetermined object is included in an image frame based on information of the type of an object acquired through an object recognition model (not shown), the electronic device 100 may acquire score information by applying the aforementioned rules based on information of the location of the identified person. In contrast, if it is identified that a person which is a predetermined object is not included in an image frame, the electronic device 100 may acquire score information by inputting the image frame into the aesthetic model 1000.

Figure 5A:
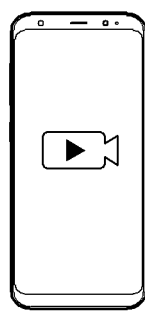
FIG. 5A is a diagram for illustrating an embodiment related to a case wherein a camera system of an electronic device includes a plurality of lenses having different angles of view.
Figure 5A:
Figure 5A:
Figure 5A:
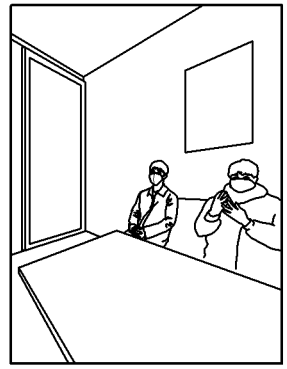
Figure 5B:
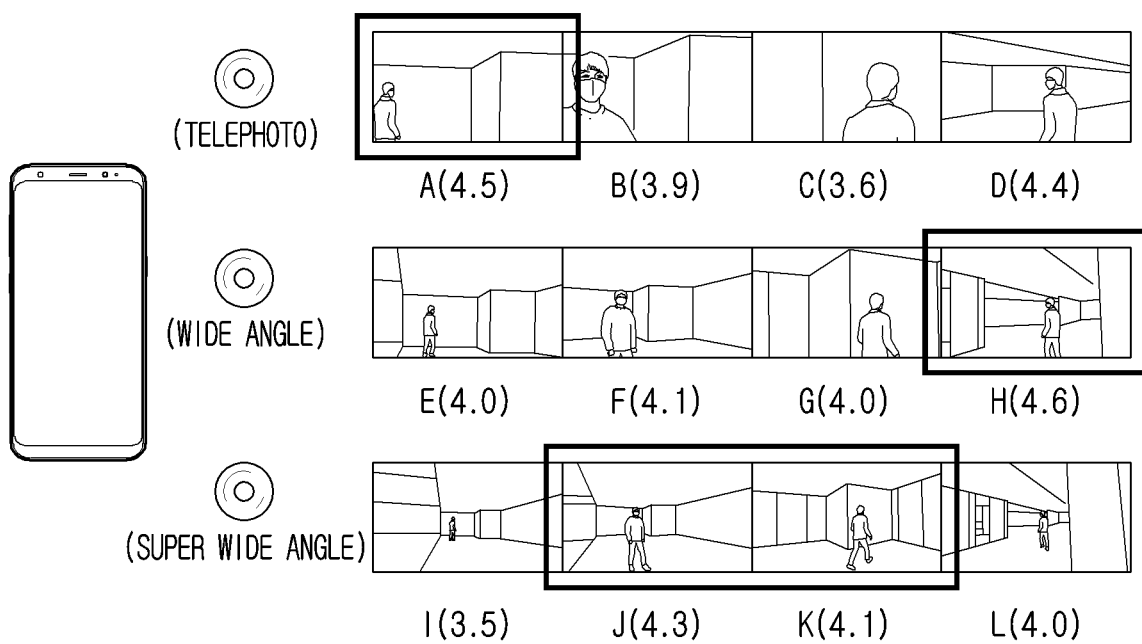
FIG. 5B is a diagram for illustrating an embodiment related to a case wherein a camera system of an electronic device includes a plurality of lenses having different angles of view and selection of a lens.

FIG. 5A and FIG. 5B are diagrams for illustrating embodiments related to a case wherein a camera of an electronic device includes a plurality of lenses having different angles of view.

According to an embodiment of the disclosure, the camera of the electronic device 100 may include a telephoto lens, a wide angle lens, and a super wide angle lens at the rear of the electronic device 100. Here, the wide angle lens may have a wider angle of view than the telephoto lens, and the super wide angle lens may have a wider angle of view than the wide angle lens. For example, the angle of view of the telephoto lens may be 8 degrees to 28 degrees, the angle of view of the wide angle lens may be 63 degrees to 84 degrees, and the angle of view of the super wide angle lens may be 94 degrees to 114 degrees.

Specifically, the telephoto lens has a narrow angle of view and a long focal distance. Accordingly, an image frame acquired through the telephoto lens may be included within the image frame as an enlarged size even though it is an object far from the electronic device, but as its angle of view is narrow, it may include only a scene in a relatively narrow view.

The wide angle lens has a wider angle of view and a shorter focal distance compared to the telephoto lens. Accordingly, an image frame acquired through the wide angle lens may include a scene in a relatively wide range, but the size of an object included in the image frame may become small and perspective distortion may occur.

The super wide angle lens has an even wider angle and an even shorter focal distance than the wide angle lens. Accordingly, an image frame acquired through the super wide angle lens may include a scene in an even wider view than the wide angle lens, but the size of an object included in the image frame may even become smaller than the wide angle lens, and a perspective distortion may occur.

FIG. 5A illustrates image frames acquired through each of the telephoto lens, the wide angle lens, and the super wide angle lens at the same time point. Referring to FIG. 5A, it can be figured out that an image frame acquired through the wide angle lens includes a scene in a wider view than an image frame acquired through the telephoto lens, and an image frame acquired through the super wide angle lens includes a scene in a wider view than an image frame acquired through the wide angle lens. Accordingly, as illustrated in FIG. 5A, objects included in each of the image frames acquired through the telephoto lens, the wide angle lens, and the super wide angle lens, and the compositions of the objects may be different.

FIG. 5B illustrates an image frame input into a neural network model, among a plurality of image frames acquired according to the disclosure and score information of the input image frames. Specifically, the image frames A to D in FIG. 5B indicate image frames input into a neural network model among a plurality of image frames acquired through the telephoto lens, and the image frames E to H indicate image frames input into a neural network model among a plurality of image frames acquired through the wide angle lens, and the image frames I to L indicate image frames input into a neural network model among a plurality of image frames acquired through the super wide angle lens.

Meanwhile, the image frames A, E, and I are image frames acquired through the telephoto lens, the wide angle lens, and the super wide angle lens at the same time point (hereinafter, they will be referred to as 'corresponding image frames'). Likewise, the image frames B, F, and J, the image frames C, G, and K, and the image frames D, H, and L respectively indicate corresponding image frames. Hereinafter, explanation will be made based on the premise that the score information in FIG. 5B has a numerical range of 0 to 5.0, and as the value is higher, the evaluation result according to the type of an object and the composition of the object, etc. is superior.

Referring to FIG. 5B, among the corresponding image frames A, E, and I, the score information of the image frame A is the highest. Accordingly, the electronic device 100 may select the telephoto lens among the telephoto lens, the wide angle lens, and the super wide angle lens based on the score information of each of the image frames A, E, and I, and store the image frames acquired through the telephoto lens in the second memory until one lens is selected again based on the score information of the image frames B, F, and J. That is, the electronic device 100 may store image frames starting from the image frame A to the image frame occurring right before the image frame B in the second memory.

Likewise, the electronic device 100 may select the super wide angle lens based on the score information of each of the image frames B, F, and J and store the image frames acquired through the super wide angle lens in the second memory, and select the super wide angle lens based on the score information of the image frames C, G, and K and store the image frames acquired through the super wide angle lens in the second memory, and select the wide angle lens based on the score information of the image frames D, H, and L and store the image frames acquired through the wide angle lens in the second memory.

As described above, for each section according to a predetermined time interval by which image frames are input into a neural network model, one lens among the telephoto lens, the wide angle lens, and the super wide angle lens may be selected, and if image frames acquired through the lenses selected for each section are stored in the second memory, the electronic device 100 may merge the image frames stored in the second memory and acquire a stored image.

Meanwhile, so far, an embodiment wherein at least one lens among a plurality of lenses is selected for each section according to a predetermined time interval by which image frames are input into a neural network model, and image frames acquired through the lenses selected for each section are stored in the second memory was described, but according to another embodiment of the disclosure, the electronic device 100 may set a section in a wider range than a predetermined time interval by which image frames are input into a neural network model, and select at least one lens among a plurality of lenses for each set section, and store image frames acquired through the selected lens in the second memory.

For example, in case a predetermined time interval by which image frames are input into a neural network model is 0.2 second (i.e., an interval of 6 frames in case the frame rate is 30 fps), the electronic device 100 may be set to select one lens among a plurality of lenses by comparing score information of each of a plurality of sections distinguished by an interval of 1 second (i.e., an interval of 30 frames in case the frame rate is 30 fps). In this case, score information which becomes a subject of comparison for each of the plurality of sections may be calculated according to the average value of score information of the image frames input into the neural network model among the plurality of image frames included in the plurality of sections. That is, in the case of selecting at least one lens among the plurality of lenses for each set section, A to L as illustrated in FIG. 5B may be one image frame included in the plurality of sections, and the score information in FIG. 5B may be the average value of the score information of the image frames input into the neural network model among the plurality of image frames included in each section.

Figure 6A:
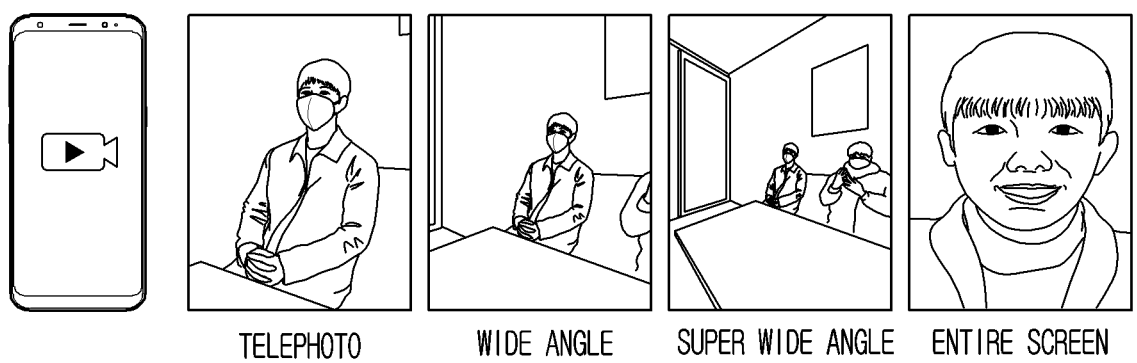
FIG. 6A is a diagram for illustrating an embodiment in case a camera system of an electronic device further includes a lens at the front of the electronic device together with a plurality of lenses at the rear of the electronic device.
Figure 6B:
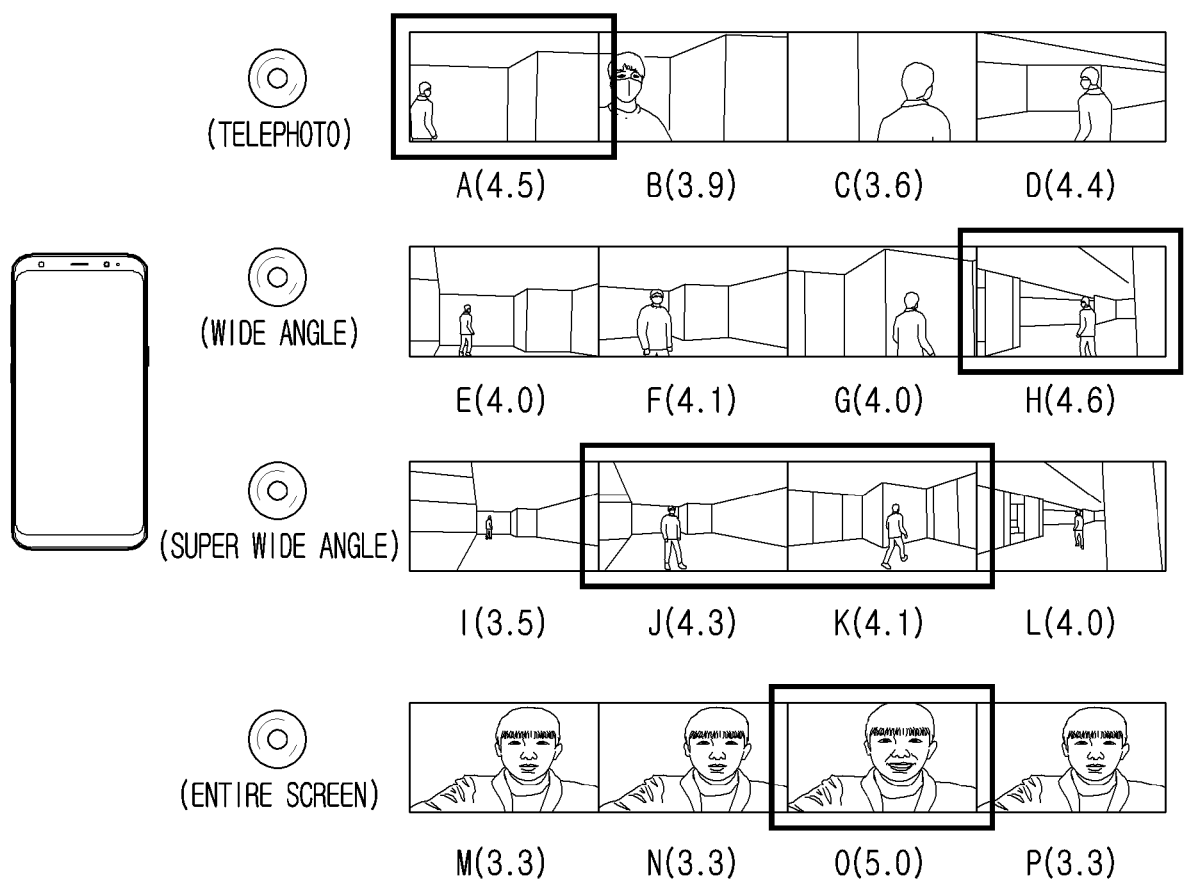
FIG. 6B is a diagram for illustrating an embodiment in case a camera of an electronic device further includes a lens at the front of the electronic device together with a plurality of lenses at the rear of the electronic device, and selection of a lens.

FIG. 6A and FIG. 6B are diagrams for illustrating embodiments in case a camera of an electronic device further includes a lens at the front of the electronic device together with a plurality of lenses at the rear of the electronic device.

According to an embodiment of the disclosure, the camera of the electronic device 100 may further include a telephoto lens at the front of the electronic device 100 (hereinafter, referred to as a front telephoto lens) together with a telephoto lens (hereinafter, referred to as a rear telephoto lens), a wide angle lens (hereinafter, referred to as a rear wide angle lens), and a super wide angle lens (hereinafter, referred to as a rear super wide angle lens) at the rear of the electronic device 100. That is, the embodiments in FIG. 6A and FIG. 6B are regarding a case of just further including a front telephoto lens, while the other parts are identical to the embodiments in FIG. 5A and FIG. 5B. Accordingly, in explaining FIG. 6A and FIG. 6B below, overlapping explanation regarding the contents described in FIG. 5A and FIG. 5B will be omitted.

FIG. 6A illustrates image frames acquired through each of the rear telephoto lens, the rear wide angle lens, the rear super wide angle lens, and the front telephoto lens at the same time point. Referring to FIG. 6A, in addition to the image frames illustrated in FIG. 5A, image frames acquired through the front telephoto lens are further illustrated. In this case, the image frames acquired through the front telephoto lens may include different objects regarding a scene in an opposite direction to the image frames acquired through the rear telephoto lens, the rear wide angle lens, and the rear super wide angle lens. In particular, as illustrated in FIG. 6A, in the image frames acquired through the front telephoto lens, a user photographing an image by using the electronic device 100 may be included as an object.

FIG. 6B illustrates image frames input into a neural network model among a plurality of image frames acquired according to the disclosure and score information of the input image frames, like FIG. 5B. In particular, the image frames A to L and score information of the image frames in FIG. 6B are identical to the image frames A to L and score information of the image frames in FIG. 5B, and the image frames M to P in FIG. 6B indicate image frames acquired through the front telephoto lens and score information of the image frames. Hereinafter, explanation will be made based on the premise that the score information in FIG. 6B has a numerical range of 0 to 5.0, and as the value is higher, the evaluation result according to the type of an object and the composition of the object, etc. is superior, like the case of FIG. 5B.

Meanwhile, in case the electronic device 100 includes a lens at the front of the electronic device 100 together with a lens at the rear of the electronic device 100, if a predetermined operation of a user is included in the image frames acquired through the lens at the front of the electronic device 100, score information of the image frames acquired through the lens at the rear of the electronic device 100 may be acquired as a lower value than the score information of the image frames acquired through the lens at the front of the electronic device 100. Here, 'a predetermined operation of a user' may include operations such as an operation of exposing a palm, a smiling operation, an uttering operation, etc.

For example, in the case of FIG. 6B, all score information of the image frames M, N, and P including a user having an expressionless face is 3.3, but score information of the image frame O including a smiling user indicates 5.0 which is the highest point. Also, score information of the image frame O may be acquired as a higher value than the image frame C acquired through the rear telephoto lens, the image frame G acquired through the rear wide angle lens, and the image frame K acquired through the rear super wide angle lens.

Referring to FIG. 6B, the score information of the image frame M is lower than the score information of the image frame A. Accordingly, in spite of the image frame M acquired through the front telephoto lens, the score information of the image frame A among the image frames A, E, I, and M corresponding to one another is the highest, like the case of FIG. 5B. Accordingly, the electronic device 100 may select the rear telephoto lens among the rear telephoto lens, the rear wide angle lens, and the rear super wide angle lens based on the score information of each of the image frames A, E, I, and M. Also, the electronic device 100 may select the rear super wide angle lens based on the score information of the image frames B, F, J, and N corresponding to one another, and select the rear wide angle lens based on the score information of the image frames D, H, L, and P corresponding to one another, as the case of FIG. 5B.

However, unlike the case of FIG. 5B, as the score information of the image frame O acquired through the front telephoto lens is higher than the score information of the image frame K acquired through the rear super wide angle lens, the electronic device 100 may select the front telephoto lens but not the rear super wide angle lens based on the score information of each of the image frames C, G, K, and O corresponding to one another.

As described above, if one lens among the telephoto lens, the wide angle lens, and the super wide angle lens is selected for each section according to a predetermined time interval by which image frames are input into a neural network model, and the image frames acquired through the lenses selected for each section are stored in the second memory, the electronic device 100 may generate an image by merging the image frames stored in the second memory, and store the generated image in the third memory.

Meanwhile, so far, explanation was made based on the premise that a smiling operation of a user is a predetermined operation for having high score information, but according to another embodiment of the disclosure, the electronic device 100 may acquire information that a user included in an image frame has a happy emotion by using an emotion recognition model that can recognize a person's emotion by analyzing the facial expression of the user, and acquire score information having a high value as score information of the image frame O based on the information.

According to the embodiments described above through FIG. 6A and FIG. 6B, the electronic device 100 may automatically merge image frames having good compositions among image frames acquired for each of the plurality of lenses at the rear of the electronic device 100, and at the same time, the electronic device 100 may, in case a user performing photographing by using the electronic device 100 takes a predetermined operation, insert an image frame for the operation into an image, and thereby provide a more special experience to the user.

Figure 7:
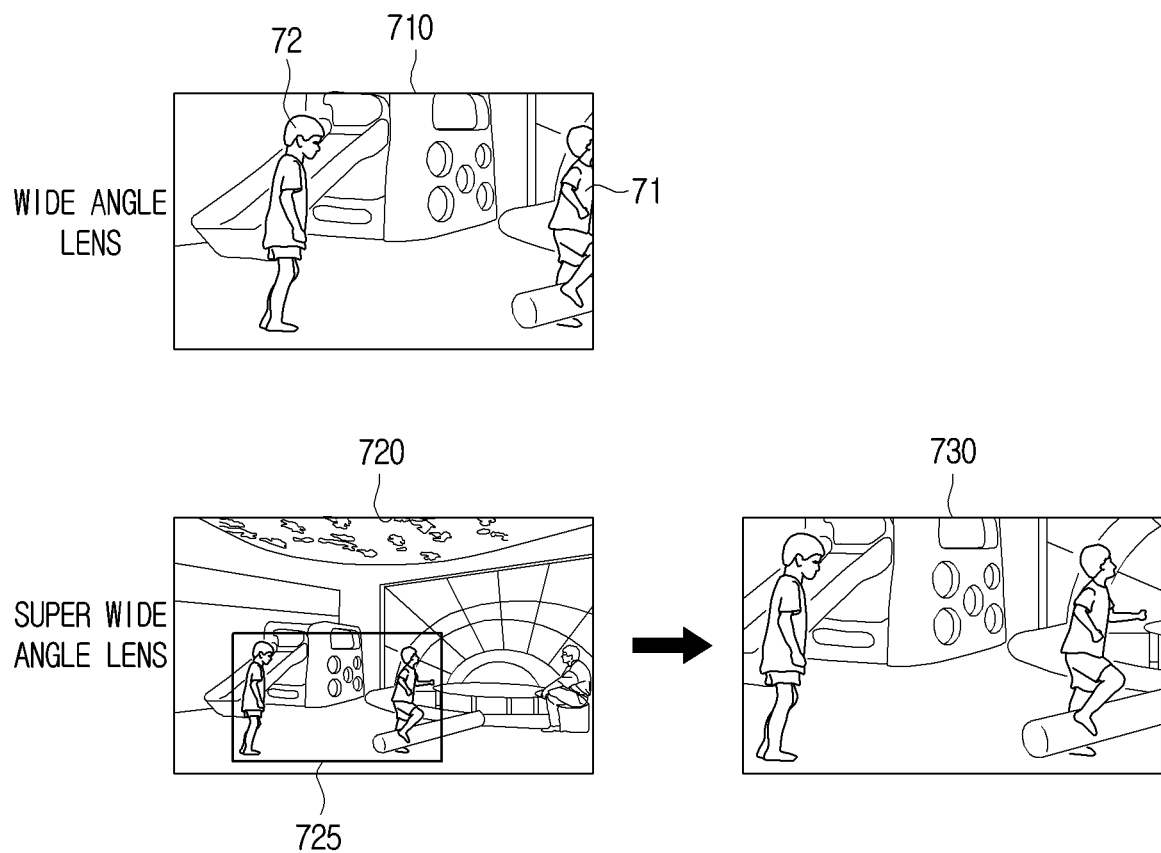
FIG. 7 is a diagram for illustrating an embodiment related to enlarging a partial area of an image frame acquired through a selected lens and providing the partial area.

FIG. 7 is a diagram for illustrating an embodiment related to enlarging a partial area of an image frame acquired through a selected lens and providing the area. Also, FIG. 8A to FIG. 8E are diagrams for illustrating other embodiments related to enlarging a partial area of an image frame acquired through a selected lens and displaying the area.

As described above, if image frames acquired through the selected at least one lens are stored in the second memory, the electronic device 100 may display the image frames stored in the second memory on the display of the electronic device 100 in real time. In this case, the electronic device 100 may not display the image frames stored in the second memory as they are, but select a partial area of some image frames among the image frames stored in the second memory, enlarge the selected partial area, and display the areas on the display.

Meanwhile, as described above, the electronic device 100 may generate an image wherein the image frames stored in the second memory are merged according to the order of the acquired time and store the image in the third memory. In this case, the electronic device 100 may not merge the image frames stored in the second memory as they are, but select a partial area of some image frames among the image frames stored in the second memory, enlarge the selected partial area, and merge the area into other image frames.

In the description regarding FIG. 7, an embodiment related to selecting a partial area of some image frames among the image frames stored in the second memory, and enlarging the selected partial area will be described based on the premise that the camera of the electronic device 100 includes two lenses, i.e., a wide angle lens and a super wide angle lens.

Referring to FIG. 7, the electronic device 100 may select one lens between the wide angle lens and the super wide angle lens based on each of the score information of the first image frame 710 acquired through the wide angle lens and the second image frame 720 acquired through the super wide angle lens. Here, as described through FIG. 4G, in the case of the first image frame 710, only a part of the person 71 is included within the image frame, but in the case of the second image frame 720, the entire person 71 exists within the image frame. Accordingly, in this case, the score information of the second image frame 720 is acquired as a higher value than the score information of the first image frame 710, and accordingly, the second image frame 720 between the first image frame 710 and the second image frame 720 may be stored in the second memory.

Meanwhile, in case an image frame acquired through the super wide angle lens like the second image frame 720 is included in a stored image or a live view image in continuation with an image frame acquired through the wide angle lens like the first image frame 710, due to the difference between the sizes of an object included in the image frame acquired through the wide angle lens and an object included in the image frame acquired through the super wide angle lens, a user may feel that the continuous images appear unnatural. Accordingly, the electronic device 100 may select a partial area 725 of the image frame acquired through the super wide angle lens like the second image frame 720, enlarge the selected partial area 725 and acquire a new image frame 730, and display the acquired new image frame 730 as a live view image on the display or include the image frame in a stored image stored in the third memory.

Here, the selected partial area 725 may be an area wherein at least one predetermined object is included within the second image frame 720. Specifically, the selected partial area 725 may be determined through a neural network model for detecting a region of interest (ROT). In particular, the selected partial area may be determined by detecting a region of interest including a predetermined object such as a person or an animal through a neural network model for detecting a region of interest.

Meanwhile, the selected partial area 725 may be determined based on a user input for selecting at least one object among a plurality of objects displayed on the display. For example, a user input for selecting at least one object may be input by touching the person 71 and the person 72 displayed on the display or according to an interaction designating the area including the person 71 and the person 72.

However, a method of selecting a partial area of an image frame is not limited to the aforementioned examples. Accordingly, hereinafter, more various embodiments related to a method of selecting a partial area of an image frame will be described with reference to FIG. 8A to FIG. 8E. In each of FIG. 8A to FIG. 8E, the image frame illustrated on the left side is an image frame acquired through a selected lens and stored in the second memory, and the image frame illustrated on the right side indicates a new image frame generated by enlarging a partial area of the image frame stored in the second memory.

Figure 8A:
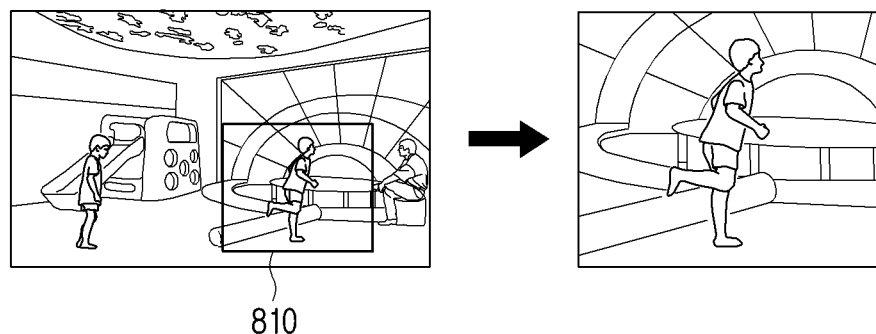
FIG. 8A-8E are diagrams for illustrating other embodiments related to enlarging a partial area of an image frame acquired through a selected lens and displaying the partial area.

Referring to FIG. 8A, the selected partial area 810 may be an area including a person appearing to have the biggest movement among a plurality of people included in an image frame. That is, as illustrated in FIG. 8A, the selected partial area 810 may be an area that includes a running person, and does not include a standing person and a sitting person among the plurality of people included in the image frame. In particular, in identifying a movement of a person included in an image frame, not only the image frame but also some frames before or after the image frame may be used.

Figure 8B:
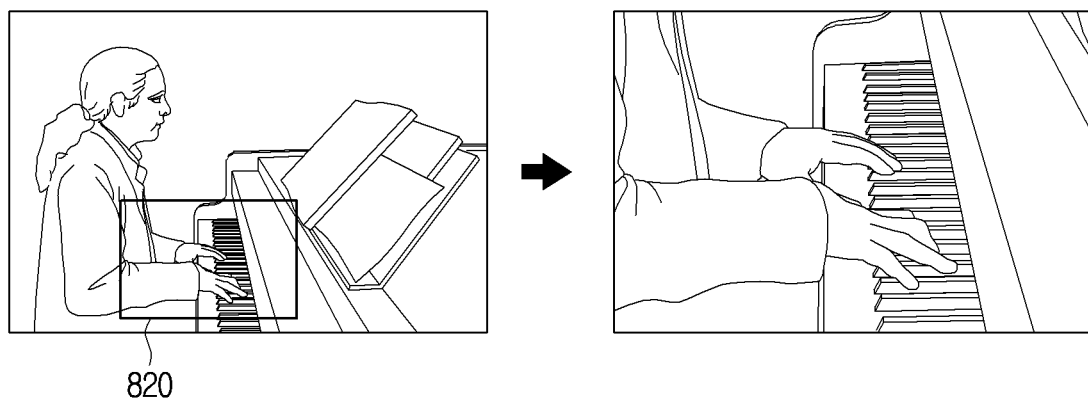

Referring to FIG. 8B, the selected partial area 820 may be an area including a body part having a big movement of a person included in an image frame. That is, as illustrated in FIG. 8A, in case a person included in an image frame is playing the piano, the selected partial area 820 may be an area including the fingers of the person. In particular, in case a movement of a person included in an object is identified based on not only the image frame but also some frames before or after the image frame, when the person playing the piano is moving the fingers slowly, the electronic device 100 may display an image frame in the same size as the image frame on the left side in FIG. 8B, and when the person playing the piano is moving the fingers fast, the electronic device 100 may display an image frame in the same size as the image frame on the right side in FIG. 8B.

Figure 8C:
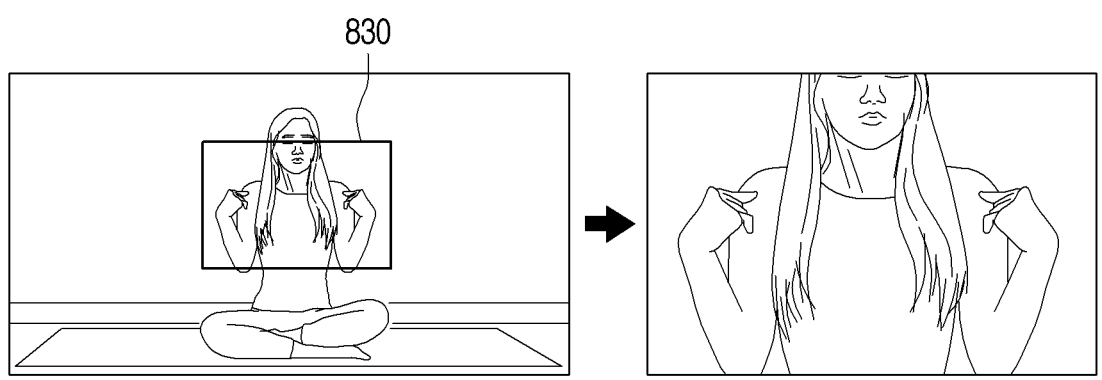
Figure 8D:
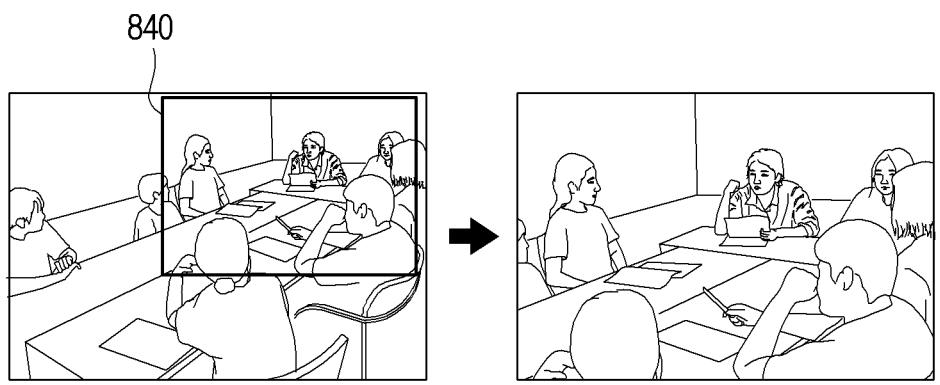
Figure 8E:
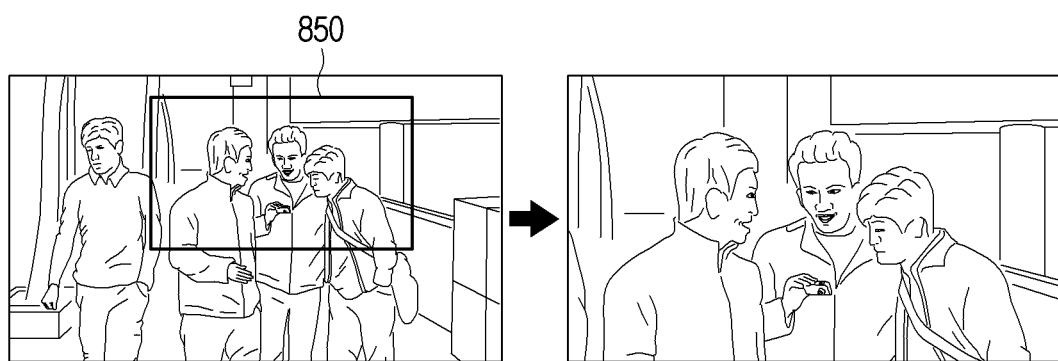

Meanwhile, as illustrated in FIG. 8C, the selected partial area 830 may be an area including a portion indicated by a finger of a person included in an image frame, and as illustrated in FIG. 8D, the selected partial area 840 may be an area including person who is speaking, among a plurality of people included in an image. Also, as illustrated in FIG. 8E, the selected partial area 850 may be an area including a smiling person among a plurality of people included in an image.

Meanwhile, in the case of enlarging a selected partial area as described above with reference to FIG. 7 to FIG. 8E, the resolution of the image frame may be reduced greatly, and accordingly, a sense of difference may be generated in a relation with an image frame wherein selection and enlargement of a partial area were not performed. Accordingly, the electronic device 100 may additionally perform a process of enlarging a selected partial area and applying various kinds of resolution modification techniques such as upscaling.

Figure 9A:
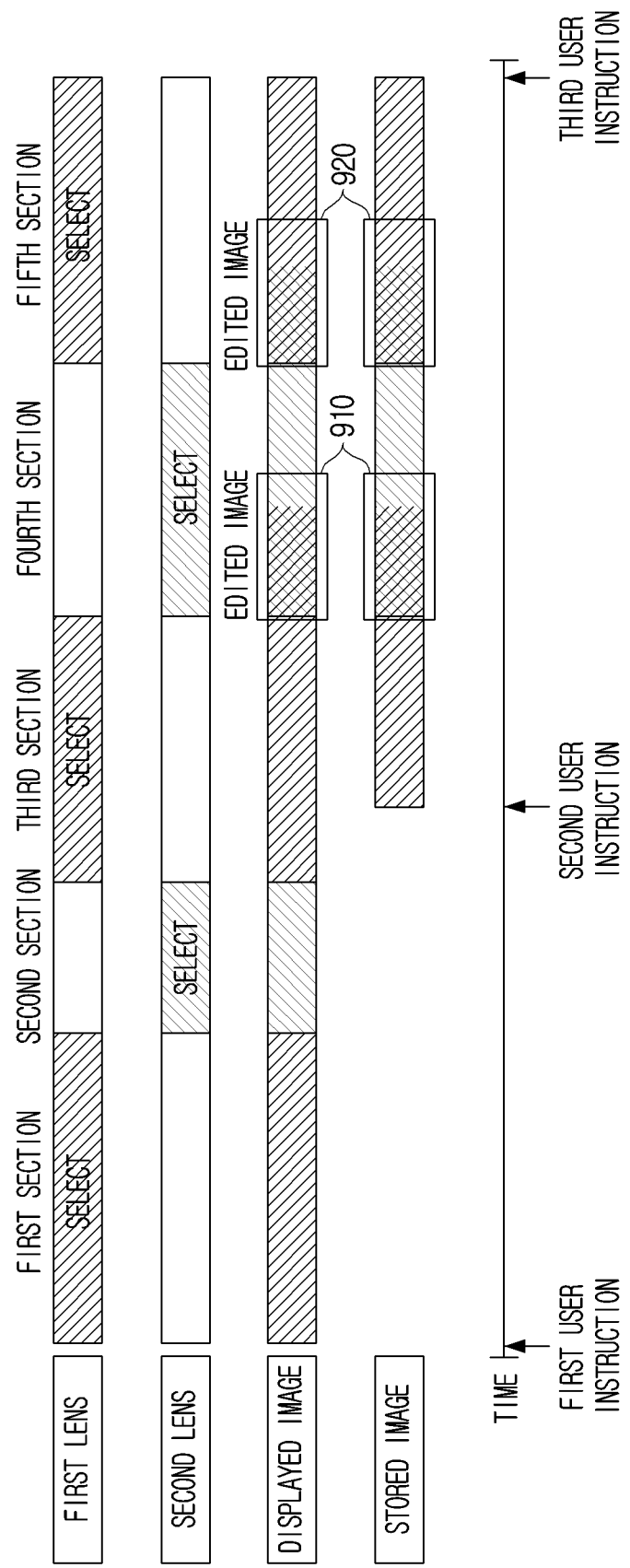
FIG. 9A is a diagram for illustrating in detail an embodiment related to selection of a lens for each section and application of a scene transition effect according to an embodiment of the disclosure.
Figure 9B:
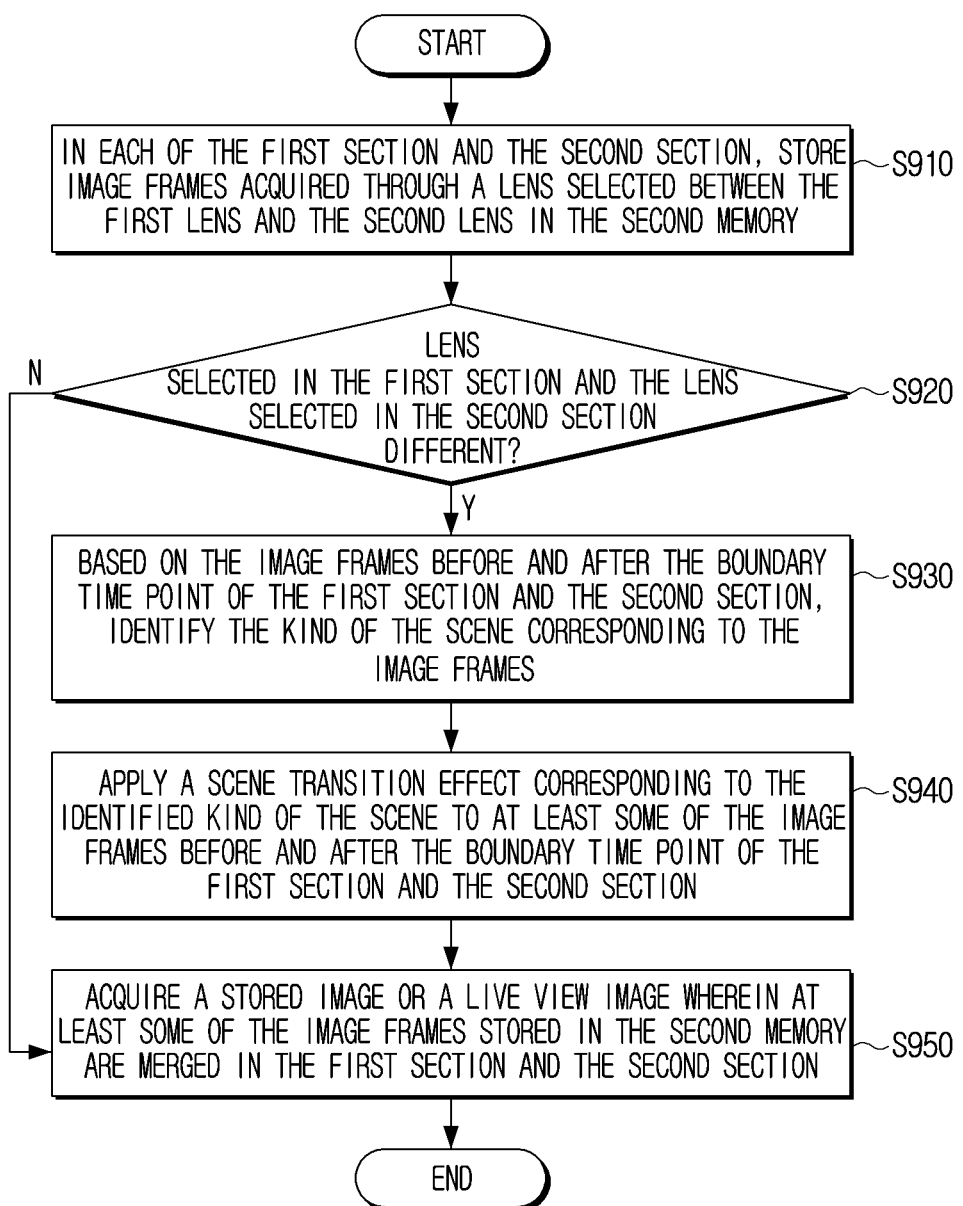
FIG. 9B is a flow chart for illustrating each operation of a method of applying a scene transition effect according to an embodiment of the disclosure.

FIG. 9A is a diagram for illustrating in detail an embodiment related to selection of a lens for each section and application of a scene transition effect according to an embodiment of the disclosure. Also, FIG. 9B is a flow chart for illustrating each operation of a method of applying a scene transition effect according to an embodiment of the disclosure.

As illustrated in FIG. 9A, the electronic device 100 may store image frames acquired through a selected lens in the first to fifth sections in the second memory, and display a live view image on the display in real time based on the image frames stored in the second memory or generate an image stored in the third memory (i.e., a stored image).

Specifically, if the first lens is selected on the starting time point of the first section, the electronic device 100 may store the image frames acquired through the first lens in the first section in the second memory. If the second lens is selected at the starting time point of the second section, the electronic device 100 may store the image frames acquired through the second lens in the second section in the second memory. If the first lens is selected at the starting time point of the third section, the electronic device 100 may store the image frames acquired through the first lens in the third section in the second memory. If the second lens is selected at the starting time point of the fourth section, the electronic device 100 may store the image frames acquired through the second lens in the fourth section in the second memory. Further, if the first lens is selected at the starting point of the fifth section, the electronic device 100 may store the image frames acquired through the first lens in the fifth section in the second memory.

As described above, if image frames acquired through a selected lens for each section are stored in the second memory, the electronic device 100 may display a live view image based on the image frames stored in the second memory on the display. In particular, a live view image may be displayed on the display from the time point when the first user input for operating a camera application stored in the electronic device 100 was received before the camera application is finished. Meanwhile, if a second user input for initiating or starting recording of the live view image is received, the electronic device 100 may generate a stored image based on the image frames stored in the second memory from the time point when the second user input was received to the time point when the third user input for ending the recording of the live view image was received and store the image in the third memory.

Meanwhile, in the case of merging the image frames stored in the second memory in a process of providing a live view image or a stored image, hardware specifications including the angle of view or brightness, etc., for each lens may be different. Accordingly, a user may feel a sense of incompatibility or unnaturalness at a portion wherein switching between image frames acquired through different lenses occurs.

Accordingly, the electronic device 100 may apply a scene transition effect to at least some of the image frames acquired through the first lens and the image frames acquired through the second lens and acquire a stored image or a live view image. Hereinafter, an embodiment related to a method of applying a scene transition effect according to the various embodiments of the disclosure will be described with reference to FIG. 9B. In particular, hereinafter, a method of applying a scene transition effect to at least some of image frames acquired in the first section which is a random section and image frames acquired in the second section which is a section continued from the first section will be described, for the convenience of explanation. However, a method as described below can obviously be performed in the entire sections wherein image frames are acquired according to the disclosure.

Referring to FIG. 9B, in each of the first section and the second section, the electronic device 100 may store image frames acquired through a lens selected between the first lens and the second lens in the second memory at operation S910. Then, the electronic device 100 may identify whether the lens selected in the first section and the lens selected in the second section are different at operation S920. In other words, the electronic device 100 may identify whether a switching of the selected lens according to the disclosure is performed at the boundary time point of the first section and the second section.

If the lens selected in the first section and the lens selected in the second section are identical at operation S920-N, the electronic device 100 may not perform the operations for applying a scene transition effect (S930 and S940), and acquire a stored image or a live view image wherein at least some of the image frames stored in the second memory are merged in the first section and the second section at operation S950.

In contrast, if the lens selected in the first section and the lens selected in the second section are different at operation S920-Y, based on the image frames before and after the boundary time point of the first section and the second section, the electronic device 100 may identify the kind of the scene corresponding to the image frames at operation S930.

Specifically, the electronic device 100 may input image frames in a predetermined number before and after the time point when the image frames acquired through the first lens are switched to the image frames acquired through the second lens into a trained scene recognition model, and identify the kind of the scene corresponding to the input image frames. Here, 'a scene recognition model' refers to a neural network model trained to output information of the kind of the scene corresponding to the input image frames or the situation of the scene corresponding to the input image frames. For example, the scene recognition model may output information that the kind of the scene corresponding to the input image frames is "a dynamic scene" or information that the kind of the scene is "a peaceful scene."

If the kind of the scene corresponding to the image frames before and after the boundary time point of the first section and the second section is identified, the electronic device 100 may apply a scene transition effect corresponding to the identified kind of the scene to at least some of the image frames before and after the boundary time point at operation S940.

Here, 'applying a scene transition effect' may mean inserting a prestored edited image into at least some of the image frames before and after the boundary time point. Here, 'an edited image' is an image of a short length (e.g.: 0.5 to 1 second) produced in advance for natural conversion of a scene, and it may be received from an external device and updated. Specifically, the electronic device 100 may identify an edited image corresponding to the identified kind of the scene among prestored edited images, and insert the identified edited image instead into at least some of the image frames before and after the time point.

For example, in case the kind of the scene corresponding to the image frames before and after the boundary time point of the first section and the second section is "a dynamic scene," the electronic device 100 may identify an edited image corresponding to "a dynamic scene" among prestored edited images, and insert the identified edited image instead into at least some of the image frames before and after the time point, and thereby make switching between the image frames acquired through the first lens and the second lens different from one another suit the dynamic scene. Meanwhile, in case the kind of the scene corresponding to the image frames before and after the boundary time point of the first section and the second section is "a peaceful scene," an edited image corresponding to "a peaceful scene" may be inserted instead into at least some of the image frames before and after the boundary time point.

Also, 'applying a scene transition effect' may mean applying a predetermined editing technique based on at least some of the image frames before and after the boundary time point. Here, 'a predetermined editing technique' may include various techniques for editing an image frame, such as fade in, fade out, zoom in, zoom out, and screen rotation, etc. Specifically, the electronic device 100 may apply an editing technique set to correspond to the identified kind of the scene to at least some of the image frames before and after the boundary time point of the first section and the second section.

For example, in case the kind of the scene corresponding to the image frames before and after the boundary time point of the first section and the second section is "a peaceful scene," the electronic device 100 may identify an edited image corresponding to "a peaceful scene" among stored edited images. Then, in the case of performing a fade in technique based on the $t^{th}$ image frame to the $t+19^{th}$ image frame acquired through the first lens and the $t^{th}$ image frame to the $t+19^{th}$ image frame acquired through the second lens, the electronic device 100 may apply the fade in technique by weight summing 95% of the $t^{th}$ image frame acquired through the first lens and 5% of the $t^{th}$ image frame acquired through the second lens, and weight summing 90% of the $t+1^{th}$ image frame acquired through the first lens and 10% of the $t+1^{th}$ image frame acquired through the second lens, and further in the same manner, weight summing 5% of the $t+19^{th}$ image frame acquired through the first lens and 95% of the $t+19^{th}$ image frame acquired through the second lens. Meanwhile, in case the kind of the scene corresponding to the image frames before and after the boundary time point of the first section and the second section is "a dynamic scene," a dynamic editing technique such as screen rotation may be applied.

Referring back to FIG. 9A, the edited image 910 in FIG. 9A indicates an edited image generated by a method of decreasing the ratio of the image frames acquired through the first lens and increasing the ratio of the image frames acquired through the second lens according to the passage of time, for natural switching from the image frames acquired through the first lens to the image frames acquired through the second lens. Meanwhile, the edited image 920 in FIG. 9A indicates an edited image generated by a method of decreasing the ratio of the image frames acquired through the second lens and increasing the ratio of the image frames acquired through the first lens according to the passage of time, for natural switching from the image frames acquired through the second lens to the image frames acquired through the first lens.

In case of switching of a selected lens is performed on the boundary point of the first section and the second section as described above, the electronic device 100 may apply the scene transition effect as described above, and acquire a stored image or a live view image wherein at least some of the image frames stored in the second memory are merged in the first section and the second section at operation S950. According to the embodiments as described above with reference to FIG. 9A and FIG. 9B, a sense of incompatibility or a sense of unnaturalness that may be generated due to switching between image frames acquired through different lenses can be overcome.

Figure 10:
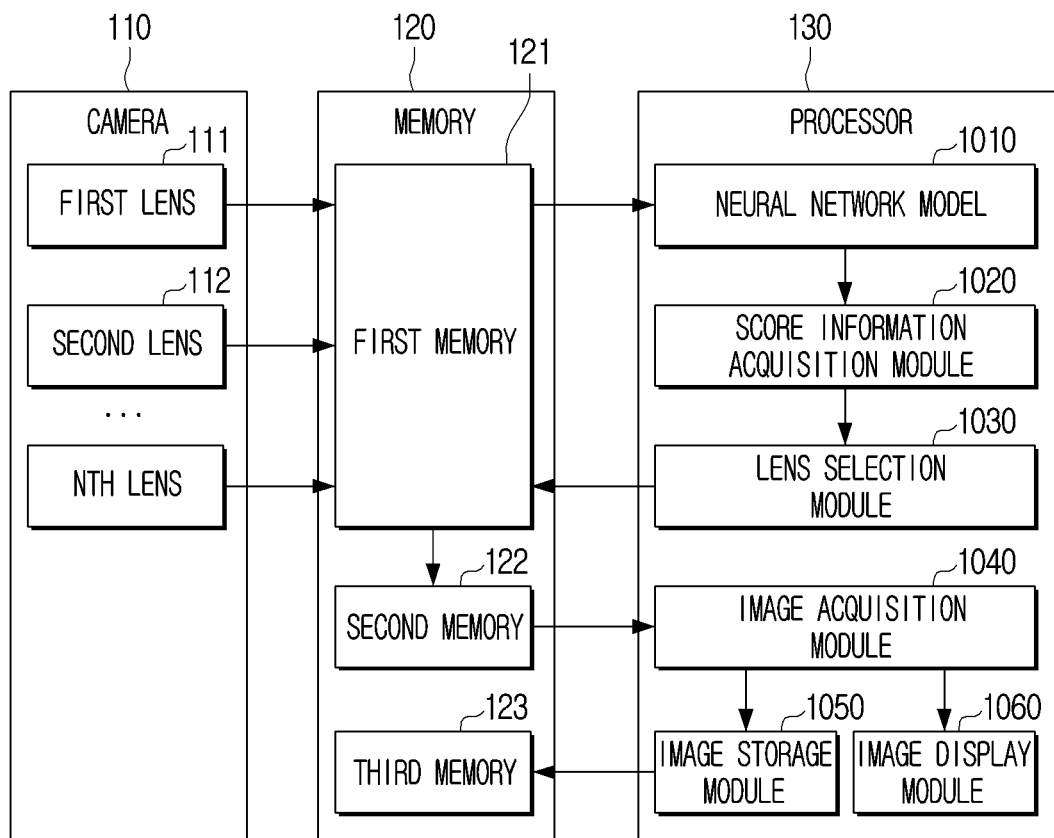
FIG. 10 is a block diagram illustrating a configuration of an electronic device according to an embodiment of the disclosure.

FIG. 10 is a block diagram illustrating a configuration of an electronic device according to an embodiment of the disclosure.

As illustrated in FIG. 10, the electronic device 100 according to the disclosure may include a camera 110, a memory 120, and a processor 130, and also include a score information acquisition module 1020, a lens selection module 1030, an image acquisition module 1040, an image storage module 1050, and an image display module 1060, etc.

The camera 110 may acquire an image for at least one object. Specifically, the camera 110 may include an image sensor, and the image sensor may convert a light that comes in through a lens into an electronic image signal. In particular, the camera 110 according to the disclosure may include a plurality of lenses that are different lenses.

In one case, the plurality of lenses are different in that the fields of view (FOV) are different and in another case, the locations where each of the plurality of lenses is located are different, etc. For example, the camera 110 of the electronic device 100 may include a supertelephoto lens, a telephoto lens, a normal lens, a wide angle lens, and a super wide angle lens, and each of the plurality of lenses may be arranged in various locations such as the front, the rear, or the sides, e.g., the front surface, the rear surface, or the side surfaces, etc., of the electronic device 100.

Specifically, the telephoto lens has a wider angle of view than the supertelephoto lens, the normal lens has a wider angle of view than the telephoto lens, the wide angle lens has a wider angle of view than the normal lens, and the super wide angle lens has a wider angle of view than the wide angle lens. For example, the angle of view of the supertelephoto lens may be from 3 degrees to 6 degrees, the angle of view of the telephoto lens may be from 8 degrees to 28 degrees, the angle of view of the normal lens may be 47 degrees, the angle of view of the wide angle lens may be 63 degrees to 84 degrees, and the angle of view of the super wide angle lens may be 94 degrees to 114 degrees.

Also, as the angle of view of a lens is wider, an image frame acquired through the lens may include a scene in a relatively wider range, but the size of an object included in the image frame may become relatively smaller and a perspective distortion may occur. Meanwhile, as the angle of view of a lens is narrower, an image frame acquired through the lens may include an object by enlarging the size of the object, but it may include a scene in a relatively narrower view.

In particular, in the various embodiments according to the disclosure, the electronic device 100 may operate a plurality of lenses simultaneously and acquire a plurality of image frames for each of the plurality of lenses.

In the memory 120, at least one instruction regarding the electronic device 100 may be stored. Also, in the memory 120, an operating system (O/S) for operating the electronic device 100 may be stored. In addition, in the memory 120, various types of software programs or applications for making the electronic device 100 operate according to the various embodiments of the disclosure may be stored. Further, the memory 120 may include a semiconductor memory such as a flash memory or a magnetic storage medium such as a hard disk, etc.

Specifically, in the memory 120, various types of software modules for operating the electronic device 100 according to the various embodiments of the disclosure may be stored, and the processor 130 may control the operation of the electronic device 100 by executing the various types of software modules stored in the memory 120. That is, the memory 120 may be accessed by the processor 130, and reading/recording/correcting/deleting/updating, etc. of data by the processor 130 may be performed.

Meanwhile, in the disclosure, the memory 120 may be, a ROM (not shown) and a RAM (not shown) inside the processor 130, or a memory card (not shown) mounted on or in the electronic device 100 (e.g., a micro SD card, a memory stick, etc.).

In particular, in the various embodiments according to the disclosure, the memory 120 may include a first memory 121, a second memory 122, and a third memory 123. Here, the first memory 121 refers to a memory that temporarily stores a plurality of image frames acquired through each of a plurality of lenses, and it may be implemented as, for example, a volatile memory like a frame buffer. The second memory 122 refers to a memory that temporarily stores image frames for a live view among the plurality of image frames stored in the first memory 121, and it may be implemented as a volatile memory like the first memory 121. Also, the third memory 123 refers to a memory that stores an image related to the plurality of image frames stored in the second memory 122, and it may be implemented as a non-volatile memory like a flash memory.

Meanwhile, in explaining the disclosure, explanation was made based on the premise that the electronic device 100 according to the disclosure includes a plurality of memories, i.e., the first memory 121, the second memory 122, and the third memory 123, but the disclosure may be implemented such that at least two memories among the first memory 121, the second memory 122, and the third memory 123 are included in the memory 120 which is physically one hardware, and correspond to each of a plurality of areas allotted inside the memory 120. For example, the disclosure may be implemented in a form wherein the electronic device 100 includes one memory 120, and in the memory 120, a first area for temporarily storing a plurality of image frames acquired through each of a plurality of lenses, a second area for temporarily storing image frames for a live view among the plurality of image frames stored in the first area, and a third area for storing an image related to the plurality of image frames stored in the second area are allotted.

The processor 130 controls the overall operations of the electronic device 100. Specifically, the processor 130 is connected to the components of the electronic device 100 including the camera 110 and the memory 120 as described above, and the processor 130 may control the overall operations of the electronic device 100 by executing at least one instruction stored in the memory 120 as described above. In particular, the processor 130 may not only be implemented as one processor 130, but also be implemented as a plurality of processors 130.

Also, the processor 130 may be implemented in various ways. For example, the processor 130 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term processor 130 may be used as a meaning including a central processing unit (CPU), a graphic processing unit (GPU), and a main processing unit (MPU), etc.

In particular, in the various embodiments according to the disclosure, if a first user input for or related to acquiring a live view image is received through the camera 110, the at least one processor 130 may acquire a plurality of image frames for a plurality of lenses and store the image frames in the first memory 121, input the plurality of image frames for each lens stored in the first memory 121 into a neural network model 1010, by a predetermined time interval, and acquire score information including composition preference information of each of the input image frames, select at least one lens among the plurality of lenses based on the score information, store image frames acquired through the selected at least one lens in the second memory 122 during the predetermined time interval, and if a second user input for initiating or starting recording of the live view image is received, store an image related to the image frames stored in the second memory 122 in the third memory 123 until a time point when a third user input for ending the recording is received.

Specifically, as illustrated in FIG. 10, the processor 130 may load the neural network model 1010 stored in the memory 120 and use it. Also, the processor 130 may include a score information acquisition module 1020, a lens selection module 1030, an image acquisition module 1040, an image storage module 1050, and an image display module 1060, etc.

The score information acquisition module 1020 refers to a module that acquires score information based on information output from the neural network model 1010. Specifically, the score information acquisition module 1020 may acquire output of the neural network model 1010 like an aesthetic model itself as score information, or it may acquire score information by applying the predefined rules as described above with reference to FIG. 4A to FIG. 4K based on information of the location of an object output from the neural network model 1010, etc.

The lens selection module 1030 refers to a module that selects at least one lens among a plurality of lenses based on score information acquired through the score information acquisition module 1020. For example, in case the camera 110 of the electronic device 100 includes two lenses, i.e., a first lens 111 and a second lens 112, if score information of a first image frame acquired through the first lens 111 is higher than or identical to score information of a second image frame acquired through the second lens 112 at the time point when the first image frame was acquired, the electronic device 100 may select the first lens 111 between the first lens 111 and the second lens 112, and if score information of the first image frame is lower than score information of the second image frame, the electronic device 100 may select the second lens 112 between the first lens 111 and the second lens 112.

Also, if at least one lens among a plurality of lenses is selected through the lens selection module 1030, the electronic device 100 may store image frames acquired through the selected at least one lens and stored in the first memory 121 in the second memory 122 during a predetermined time interval. In particular, the lens selection module 1030 may not only be implemented as a software module, but also as a hardware module integral to the processor 130 or as a hardware module that is separate from the processor 130.

The image acquisition module 1040 refers to a module that acquires a live view image to be displayed on the display 161 device or a stored image to be stored in the third memory 123 based on the image frames stored in the second memory 122. In particular, the image acquisition module 1040 may not only merge the image frames stored in the second memory 122 according to the time order that the image frames were acquired, but also perform a process of enlarging some areas of the image frames stored in the second memory 122 and merging the areas into other image frames and a process of applying a scene transition effect to at least some of the image frames acquired through the first lens 111 and the image frames acquired through the second lens 112.

The image storage module 1050 refers to a module that stores a stored image acquired through the image acquisition module 1040 in the third memory 123. As described above, the third memory 123 may be implemented as a volatile memory like a flash memory, and a stored image may be stored in the third memory 123 in the form of video files in various formats. Thus, a user may reproduce and view a stored image stored in the third memory 123 or transmit the image to an external device and share the image with another user.

The image display module 1060 refers to a module that controls the display to display a live view image acquired through the image acquisition module 1040 in real time. Specifically, the image display module 1060 may transmit a control signal for making image frames acquired through the selected at least one lens displayed as an entire screen to the display, and while the image frames acquired through one lens set as a default between the first lens 111 or the second lens 112 are displayed on the display as an entire screen, the image display module 160 may transmit a control signal for making the image frames acquired through the selected at least one lens displayed in the form of Picture by Picture (PBP) or Picture in Picture (PIP) to the display.

Other than the above, the various embodiments according to the disclosure based on control of the processor 130 were described above with reference to FIG. 1 to FIG. 9B. Accordingly, overlapping explanation will be omitted.

Figure 11:
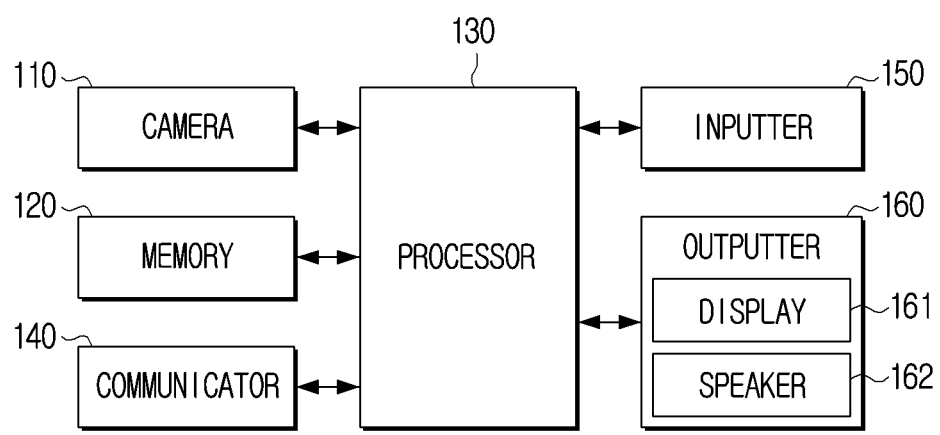
FIG. 11 is a block diagram illustrating in more detail a hardware configuration of an electronic device according to an embodiment of the disclosure.

FIG. 11 is a block diagram illustrating in more detail a hardware configuration of an electronic device according to an embodiment of the disclosure.

As illustrated in FIG. 11, the electronic device 100 according to the disclosure may not only include a camera 110, a memory 120, and a processor 130, but also further include a communicator 140, an inputter 150, and an outputter 160, etc. However, the components as above are merely exemplary ones, and in implementing the disclosure, it is obvious that new components can be added in addition to the components as above, or some components can be omitted.

The communicator 140 includes circuitry, and it may perform communication with an external device. Specifically, the processor 130 may receive various kinds of data or information from an external device connected through the communicator 140, and it may also transmit various kinds of data or information to an external device.

The communicator 140 may include at least one of a WiFi module, a Bluetooth module, a wireless communication module, or an NFC module. Specifically, the WiFi module and the Bluetooth module may respectively perform communication by a WiFi method and a Bluetooth method. In the case of using a WiFi module or a Bluetooth module, various kinds of connection information such as SSID, etc. may be transmitted and received first, and communication is connected by using this, and then various kinds of information may be transmitted and received.

Also, the wireless communication module may perform communication according to various communication standards such as IEEE, Zigbee, 3rd generation (3G), 3rd generation partnership project (3GPP), long term evolution (LTE), 5th generation (5G), etc. Also, an NFC module may perform communication by a near field communication (NFC) method using a 13.56 MHz band among various RF-ID frequency bands such as 135 kHz, 13.56 MHz, 433 MHz, 860~960 MHz, 2.45 GHz, etc.

In particular, in the various embodiments according to the disclosure, the communicator 140 may receive various kinds of information such as the neural network model 1010, data related to the neural network model 1010, information of predefined rules related to score information, template information of generating an edited image, etc. from an external device.

The inputter 150 includes circuitry, and the processor 130 may receive a user input for controlling the operation of the electronic device 100 through the inputter 150. Specifically, the inputter 150 may consist of components such as a microphone and a remote control signal receiver (not shown), etc., and it may also be implemented as a form of being included in the display 161 as a touch screen.

In particular, in the various embodiments according to the disclosure, the inputter 150 may receive user inputs such as a first user input for or related to acquiring a live view image, a second user input for initiating or starting recording of the live view image, and a third user input for ending the recording of the live view image, etc.

The outputter 160 includes circuitry, and the processor 130 may output various functions that the electronic device 100 can perform through the outputter 160. Also, the outputter 160 may include a display 161 and a speaker 162. In particular, the display 161 may be implemented as a liquid crystal display (LCD) panel, organic light emitting diodes (OLED), etc. In addition, it is also possible that the display 161 is implemented as a flexible display, a transparent display, etc. depending on cases. However, the display 161 according to the disclosure is not limited to specific types.

In particular, in the various embodiments according to the disclosure, the outputter 160 may output a live view image acquired through the image acquisition module 1040, and output a stored image according to a user input for reproducing a stored image stored in the third memory 123.

Meanwhile, the controlling method of the electronic device 100 according to the aforementioned embodiments may be implemented as a program and provided to the electronic device 100. In particular, a program including a controlling method of the electronic device 100 may be provided while being stored in a non-transitory computer readable medium.

Specifically, in a non-transitory computer readable recording medium including a program executing a controlling method of the electronic device 100, the controlling method of the electronic device 100 includes the operations of, based on a first user input for or related to acquiring a live view image through a camera 110 including a plurality of lenses different from one another being received, acquiring a plurality of image frames for each of the plurality of lenses and storing the image frames in a first memory 121, inputting the plurality of image frames for each lens stored in the first memory 121 into a neural network model 1010, by a predetermined time interval, and acquiring score information including composition preference information of each of the input image frames, selecting at least one lens among the plurality of lenses based on the score information, storing image frames acquired through the selected at least one lens in a second memory 122 during the predetermined time interval, and based on a second user input for initiating or starting recording of the live view image being received, storing an image related to the image frames stored in the second memory 122 in a third memory 123 until a time point when a third user input for ending the recording is received.

Here, a non-transitory computer readable medium refers to a medium that stores data semi-permanently, and is readable by machines, but not a medium that stores data for a short moment such as a register, a cache, and a memory 120. Specifically, the aforementioned various applications or programs may be provided while being stored in a non-transitory computer readable medium such as a CD, a DVD, a hard disc, a blue-ray disc, a USB, a memory 120 card, a ROM and the like.

So far, a controlling method of the electronic device 100, and a computer-readable recording medium including a program executing the controlling method of the electronic device 100 were described briefly, but this is just for omitting overlapping explanation, and it is obvious that the various embodiments regarding the electronic device 100 can be applied to a controlling method of the electronic device 100, and a computer-readable recording medium including a program executing the controlling method of the electronic device 100.

According to the aforementioned various embodiments of the disclosure, the electronic device 100 may acquire a new image by automatically merging image frames suitable to be provided to a user among image frames acquired for each of a plurality of lenses different from one another included in the camera 110, and accordingly, noticeable user convenience can be provided.

Also, in case a neural network model 1010 according to the disclosure is implemented on-device, a lens acquiring image frames to be provided to a user can be selected among a plurality of lenses without transmitting image frames acquired for each of the plurality of lenses to an external server. That is, according to the disclosure, security related to privacy of a user can be secured together with user convenience.

Further, while the electronic device 100 according to the disclosure acquires a plurality of image frames for each of a plurality of lenses, the electronic device 100 may provide image frames corresponding to a lens selected in real time to a user by a live view method. Also, the electronic device 100 may generate an image wherein the image frames corresponding to the lens selected in real time are merged, and thus user convenience can be further improved.

In addition, the electronic device 100 according to the disclosure may automatically merge image frames having good compositions among image frames acquired for each of the plurality of lenses at the rear of the electronic device 100, and at the same time, the electronic device 100 may, in case a user performing photographing or capturing video by using the electronic device 100 takes a predetermined operation, insert an image frame for the operation into an image, and thereby provide a more special experience to the user.

Further, the electronic device 100 according to the disclosure may apply a scene transition effect to at least some of image frames acquired through lenses different from one another in a process of providing a live view image or a stored image, and thereby overcome a sense of incompatibility or a sense of unnaturalness according to differences in hardware specifications such as differences in angles of view or brightness, etc. for each lens.

Meanwhile, the functions related to a neural network model as described above may be performed through a memory and a processor. The processor may consist of one or a plurality of processors. Here, the one or plurality of processors may be generic-purpose processors such as a CPU, an AP, etc., graphic-dedicated processors such as a GPU, a VPU, etc., or artificial intelligence-dedicated processors such as an NPU. The one or plurality of processors perform control to process input data according to a predefined operation rule or an artificial intelligence model stored in a non-volatile memory and a volatile memory. The predefined operation rule or the artificial intelligence model is characterized in that it is made through learning.

Here, being made through learning means that a learning algorithm is applied to a plurality of learning data, and a predefined operation rule or an artificial intelligence model having a desired characteristic is thereby made. Such learning may be performed in a device wherein artificial intelligence is performed itself according to the disclosure, or performed through a separate server and/or system.

An artificial intelligence model may consist of a plurality of neural network layers. Each layer has a plurality of weight values, and performs an operation of the layer through the operation result of the previous layer and an operation of the plurality of weight values. As examples of a neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN), generative adversarial networks (GANs), and deep Q-networks, but the neural network in the disclosure is not limited to the aforementioned examples excluding specified cases.

A learning algorithm is a method of training a specific subject device (e.g., a robot) by using a plurality of learning data and thereby making the specific subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

A storage medium that is readable by machines may be provided in the form of a non-transitory storage medium. Here, the term 'non-transitory storage medium' only means that the device is a tangible device, and does not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

According to an embodiment of the disclosure, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium readable by the server of the manufacturer, the server of the application store, or the memory of the relay server at least temporarily, or may be generated temporarily.

In addition, each of the components (e.g.: a module or a program) according to the aforementioned various embodiments of the disclosure may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner.

Further, operations performed by a module, a program, or other components according to the various embodiments of the disclosure may be executed sequentially, in parallel, repetitively, or heuristically. Or, at least some of the operations may be executed in a different order, omitted, or other operations may be added.

Meanwhile, the term "part" or "module" used in the disclosure includes a unit consisting of hardware, software, or firmware, and it may be interchangeably used with terms, for example, logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

Also, the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include an electronic device (e.g.: the electronic device 100) according to the aforementioned embodiments.

In case an instruction is executed by a processor, the processor may perform a function corresponding to the instruction by itself, or by using other components under its control. An instruction may include a code that is generated or executed by a compiler or an interpreter.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
   a camera system comprising a plurality of lenses that are different;
   memory; and
   a processor configured to:
   based on receiving a first user input relating to acquiring a live view image, control the camera system to acquire a plurality of image frames through each of the plurality of lenses,
   input image frame of the plurality of image frames into a neural network model, and acquire score information by using the neural network model, the score information indicating an aesthetic of each of the input image frames,
   select at least one lens among the plurality of lenses based on the score information,
   store in the memory, image frames acquired through the selected at least one lens, wherein a partial area of at least one of the image frames acquired through the selected at least one lens is enlarged, and
   based on receiving a second user input for starting recording of the live view image, store an image related to the image frames stored in the memory until a third user input for ending the recording is received.

2. The electronic device of claim 1,
   wherein the plurality of lenses comprises a first lens and a second lens, and
   the at least one processor is configured to:
   based on score information of a first image frame acquired through the first lens being higher than or identical to score information of a second image frame acquired through the second lens at the time point when the first image frame was acquired, select the first lens, and
   based on the score information of the first image frame being lower than the score information of the second image frame, select the second lens.

3. The electronic device of claim 2,
   wherein the first lens and the second lens are disposed at a first surface of the electronic device,
   a field of view of the first lens is less than the field of view of the second lens, and
   based on a predetermined object not being included in the first image frame and being included in the second image frame, the score information of the first image frame is lower than the score information of the second image frame.

4. The electronic device of claim 3,
   wherein the predetermined object is an object selected by the user of the electronic device among a plurality of objects included in the first image frame or the second image frame.

5. The electronic device of claim 2,
   wherein the first lens is at a rear of the electronic device, the second lens is at a front of the electronic device, and
   based on a predetermined operation of a user being included in the second image frame, the score information of the first image frame is lower than the score information of the second image frame.

6. The electronic device of claim 2,
   wherein the memory comprises:
   a first memory configured to store the plurality of image frames acquired through each of the plurality of lenses;
   a second memory configured to store image frames for a live view among the plurality of image frames stored in the first memory; and
   a third memory configured to store an image related to the image frames for the live view stored in the second,
   wherein the plurality of image frames acquired through the plurality of lenses according to the first user input is stored in the first memory,
   wherein the image frames acquired through the selected at least one lens is stored in the second memory during a predetermined time interval at which the image frames are input to the neural network mode; and
   wherein the image related to the image frames are stored in the third memory.

7. The electronic device of claim 6,
   wherein the image related to the image frames stored in the second memory is an image generated by merging at least one of the image frames stored in the second memory according to a time order, or
   the image related to the image frames stored in the second memory is an image wherein a scene transition effect was applied to at least one of the image frames acquired through the first lens and the image frames acquired through the second lens.

8. The electronic device of claim 7,
   wherein the scene transition effect is applied to the image related to the image frames stored in the second memory by inserting a prestored image into at least one of image frames before and after a boundary time point between the image frames acquired through the first lens and the image frames acquired through the second lens, or applying a predetermined editing technique based on at least one of the image frames before and after the boundary time point.

9. The electronic device of claim 1, further comprising:
   a display,
   wherein the at least one processor is configured to:
   based on image frames acquired through the selected at least one lens being stored in the memory, control the display to display the image frames stored in the memory in real time.

10. The electronic device of claim 1,
    wherein the partial area of at least one of the image frames comprises at least one object predetermined by a user.

11. A controlling method of an electronic device, the method comprising:
    based on receiving a first user input relating to acquiring a live view image through a camera system including a plurality of lenses that are different, acquiring a plurality of image frames through each of the plurality of lenses;

inputting image frame of the plurality of image frames into a neural network model, and acquiring score information by using the neural network model, the score information indicating an aesthetic of each of the input image frames;

selecting at least one lens among the plurality of lenses based on the score information;

storing in a memory, image frames acquired through the selected at least one lens;

wherein a partial area of at least one of the image frames acquired through the selected at least one lens is enlarged; and based on receiving a user input for starting recording of the live view image, storing an image related to the image frames stored in the memory until a third user input for ending the recording is received.

12. The controlling method of an electronic device of claim 11, wherein the plurality of lenses includes a first lens and a second lens, and the selecting at least one lens comprises:

based on score information of a first image frame acquired through the first lens being higher than or identical to score information of a second image frame acquired through the second lens at the time point when the first image frame was acquired, selecting the first lens; and based on the score information of the first image frame being lower than the score information of the second image frame, selecting the second lens.

13. The controlling method of an electronic device of claim 12, wherein the first lens and the second lens are disposed at a first surface of the electronic device, a field of view of the first lens is less than the field of view of the second lens, and based on a predetermined object not being included in the first image frame and being included in the second image frame, the score information of the first image frame is lower than the score information of the second image frame.

14. The controlling method of an electronic device of claim 13, wherein the predetermined object is an object selected by the user of the electronic device among a plurality of objects included in the first image frame or the second image frame.

15. The controlling method of an electronic device of claim 12, wherein the first lens is arranged at the rear surface of the electronic device, the second lens is arranged at the front surface of the electronic device, and based on a predetermined operation of a user being included in the second image frame, the score information of the first image frame is lower than the score information of the second image frame.

16. The controlling method of an electronic device of claim 12, wherein the memory includes:

a first memory configured to store the plurality of image frames acquired through each of the plurality of lenses;

a second memory configured to store image frames for a live view among the plurality of image frames stored in the first memory; and a third memory configured to store an image related to the image frames for the live view stored in the second, wherein the plurality of image frames acquired through the plurality of lenses according to the first user input is stored in the first memory, wherein the image frames acquired through the selected at least one lens is stored in the second memory during a predetermined time interval at which the image frames are input to the neural network mode; and wherein the image related to the image frames are stored in the third memory.

17. The controlling method of an electronic device of claim 16, wherein the image related to the image frames stored in the second memory is an image generated by merging at least one of the image frames stored in the second memory according to a time order, or the image related to the image frames stored in the second memory is an image wherein a scene transition effect was applied to at least one of the image frames acquired through the first lens and the image frames acquired through the second lens.

18. A non-transitory computer readable recording medium including a program executing a controlling method of an electronic device, wherein the controlling method of an electronic device comprises:

based on receiving a first user input relating to acquiring a live view image through a camera system including a plurality of lenses that are different, acquiring a plurality of image frames through each of the plurality of lenses;

inputting image frame of the plurality of image frames into a neural network model, and acquiring score information by using the neural network model, the score information indicating an aesthetic of each of the input image frames;

selecting at least one lens among the plurality of lenses based on the score information;

storing in a memory, image frames acquired through the selected at least one lens; wherein a partial area of at least one of the image frames acquired through the selected at least one lens is enlarged; and based on receiving a user input for starting recording of the live view image, storing an image related to the image frames stored in the memory until a third user input for ending the recording is received.

19. The electronic device of claim 1, wherein the score information indicates an aesthetic based on a composition of the input image frame in which an object and a background are arranged.

20. The controlling method of an electronic device of claim 11, wherein the score information indicates an aesthetic based on a composition of the input image frame in which an object and a background are arranged.

* * * * *